(12) United States Patent
Narayana et al.

(10) Patent No.: US 6,469,983 B2
(45) Date of Patent: Oct. 22, 2002

(54) DATA PACKET TRANSMISSION SCHEDULING USING A PARTITIONED HEAP

(75) Inventors: Pidugu Narayana, Sunnyvale; Makarand Dharmapurikar, San Jose, both of CA (US)

(73) Assignee: Maple Optical Systems, Inc., San Jose, CA (US)

( * ) Notice: Subject to any disclaimer, the term of this patent is extended or adjusted under 35 U.S.C. 154(b) by 0 days.

(21) Appl. No.: 10/083,965

(22) Filed: Feb. 26, 2002

(65) Prior Publication Data

US 2002/0118645 A1 Aug. 29, 2002

Related U.S. Application Data

(60) Provisional application No. 60/271,805, filed on Feb. 26, 2001.

(51) Int. Cl.[7] .............................. H04J 3/14; H04L 12/56
(52) U.S. Cl. ....................... 370/231; 370/389; 370/412; 370/477; 709/238
(58) Field of Search ...................... 370/229, 131–232, 370/235, 389–392, 394, 399, 395.2, 395.41, 395.52, 395.53, 401–412, 419, 477; 340/825.02; 709/234, 238, 240

(56) References Cited

U.S. PATENT DOCUMENTS

| | | | | |
|---|---|---|---|---|
| 5,699,519 A | * | 12/1997 | Shiobara | 395/200 |
| 5,844,890 A | * | 12/1998 | Delp et al. | 370/230 |
| 5,859,835 A | * | 1/1999 | Varma | 370/229 |
| 6,081,507 A | * | 6/2000 | Chao et al. | 370/235 |
| 6,115,360 A | * | 9/2000 | Quay et al. | 370/235 |
| 6,134,217 A | * | 10/2000 | Stiliadis | 370/232 |
| 6,173,325 B1 | * | 1/2001 | Kukreja | 709/224 |
| 6,205,150 B1 | * | 3/2001 | Rusczyk | 370/412 |
| 6,205,151 B1 | * | 3/2001 | Quay et al. | 370/395.51 |
| 6,256,315 B1 | * | 7/2001 | Barbas et al. | 370/412 |

OTHER PUBLICATIONS

Davie, B. and Rekhter Y., "MPLS Technology and Applications," Chapter 6 Quality of Service, Morgan Kaufman Publishers, pp. 147–170, (2000).

"Pipelined heap (priority queue) management for advanced scheduling in high–speed networks" by Ioannou, A.; Katevins, M. Communications, 2001. ICC 2001. IEEE International Conference on vol. 7, pages 2043–2047.*

"Design of a high–speed packet switch with fine–grained quality–of–service guarantees" by Bhagwan, R.; Lin, B. Communications, 2000. ICC 2000. 2000 IEEE International Conference on vol. 3, pp. 1430–1434.*

"Fast and scalable priority queue architecture for high–speed network switches" Bhagwan, R.; Lin, B. Nineteenth Annual Joint Conference of the IEEE Computer and Communications Societies. IEEE, vol. 2, 2000, pp. 538–574.*

* cited by examiner

*Primary Examiner*—Alpus H. Hsu
*Assistant Examiner*—Afsar M. Qureshi
(74) *Attorney, Agent, or Firm*—Stevens & Westberg LLP

(57) ABSTRACT

The present invention is directed toward methods and apparatus for data packet transmission scheduling using a partitioned scheduling heap data structure. The scheduling heap data structure has a plurality of levels for storing scheduling values for data packets according to their relative priorities. A highest level in the heap has a single position and each succeeding lower level has twice the number of positions as the preceding level. The data structure may be adapted to store a plurality of logical heaps within the heap data structure by assigning a highest level of each logical heap to a level in the heap data structure that is lower than the highest level. Thus, a single physical memory may be adapted to store plural logical heaps. This is useful because a single physical memory can be adapted to prioritize packets of various different transmission protocols and speeds.

24 Claims, 20 Drawing Sheets

| | | | | | | | |
|---|---|---|---|---|---|---|---|
| L1 | I1 1002 | I2 1004 | RI 1006 | No-Op 1008 | | | |
| L2 | | | I1 1010 | I2 1012 | RI 1014 | No-Op 1016 | |
| L3 | | | | | I1 1018 | I2 1020 | RI 1022 | No-Op 1024 |
| L4 | | | | | | | |

Four-cycle Baseline Window

| | | | | | | | | |
|---|---|---|---|---|---|---|---|---|
| L1 | I1 1002 | I2 1004 | RI 1006 | No-Op 1016 | I1 | I2 | RI | No-Op | I1 |
| L2 | | | No-Op 1008 | I1 1010 | I2 1012 | RI 1014 | No-Op | I1 | I2 |
| L3 | | | | | | No-Op 1016 | I1 1018 | I2 1020 | RI 1022 |
| L4 | | | | | | | | | No-Op 1024 |

Figure 11

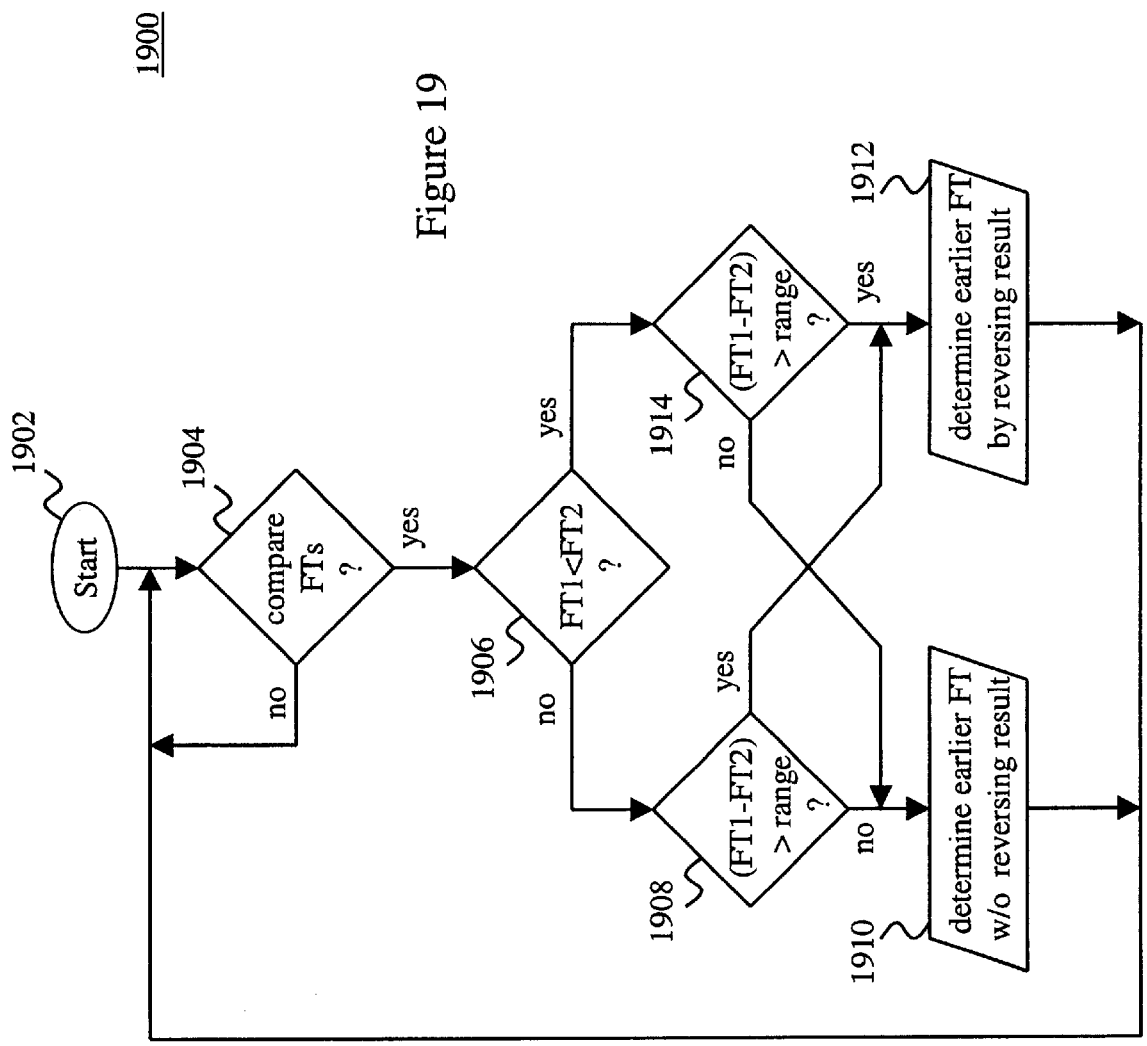

DATA PACKET TRANSMISSION SCHEDULING USING A PARTITIONED HEAP

This application claims the benefit of U.S. Provisional Application Ser. No. 60/271,805, filed Feb. 26, 2001.

The contents of U.S. patent application Ser. No. 10/084,112, filed on the same day as this application, and entitled, "DATA PACKET TRANSMISSION SCHEDULING"; U.S. patent application Ser. No. 10/084,524, filed on the same day as this application, and entitled, "PACKET TRANSMISSION SCHEDULING IN A DATA COMMUNICATION NETWORK"; and U.S. patent application Ser. No. 10/083,981, filed on the same day as this application, and entitled, "DATA PACKET TRANSMISSION SCHEDULING BASED ON ANTICIPATED FINISH TIMES" are hereby incorporated by reference.

FIELD OF THE INVENTION

The invention relates to the field of data communication networks. More particularly, the present invention relates to methods and apparatus for scheduling data packets being sent within a data communication network.

BACKGROUND OF THE INVENTION

In a network that serves multiple user entities for various different purposes, it is important that the resources of the network are allocated appropriately. For example, it may be desired to dynamically allocate network resources between important or time-critical communications and those that are of lower importance or are less time-critical. This is to ensure that all communications reach their destinations when needed (or least to ensure that only low importance communications are subject to significant delays). For example, certain communications may be intolerant to delays, such as voice or video communications. In addition, certain network users may desire higher levels of network availability than others. Conversely, other users or other types of communications, such as batch file transfers, may be more tolerant of communication delays.

In network equipment, such as switches or routers, data packets are typically received and buffered prior to retransmission. The equipment then forwards the data packets to their appropriate destinations and may also perform other functions. For example, each piece of network equipment may allocate network resources to the various data communications it receives by appropriately scheduling its buffered packets before forwarding them. As computer networks evolve, there is an ever-increasing need to provide more bandwidth, lower latency, decreased costs and increased flexibility. Accordingly, there is a need to provide techniques for scheduling the retransmission of data packets that respond to these needs.

A conventional technique for scheduling retransmission of data packets involves the use of a heap data structure. Packets awaiting retransmission are placed in the heap and arranged in accordance with their priorities prior to retransmission. Further, network switches or routers typically provide multiple ports and/or transmission channels that may be used for re-transmitting packets received by the switch or router. Accordingly, what is needed is a technique for efficiently and flexibly scheduling retransmission of packets via several ports and communication channels. What is also needed is a technique for arranging the heap quickly and efficiently.

Aspects of the invention are variously directed to these ends.

SUMMARY OF THE INVENTION

The present invention is directed toward methods and apparatus for data packet transmission scheduling using a partitioned scheduling heap data structure. The scheduling heap data structure has a plurality of levels for storing scheduling values for data packets according to their relative priorities. A highest level in the heap has a single position and each succeeding lower level has twice the number of positions as the preceding level. The data structure may be adapted to store a plurality of logical heaps within the heap data structure by assigning a highest level of each logical heap to a level in the heap data structure that is lower than the highest level. Thus, a single physical memory may be adapted to store plural logical heaps. This is useful because a single physical memory can be adapted to prioritize packets of various different transmission protocols and speeds.

BRIEF DESCRIPTION OF THE DRAWINGS

FIG. 10 illustrates a timing diagram for pipelining of insert and re-insert instructions in accordance with an aspect of the present invention;

FIG. 11 illustrates additional detail of the timing diagram of FIG. 10;

FIG. 19 illustrates a flow diagram for comparing arrival times in accordance with an aspect of the present invention.

DETAILED DESCRIPTION OF THE PREFERRED EMBODIMENTS

Figure 1:
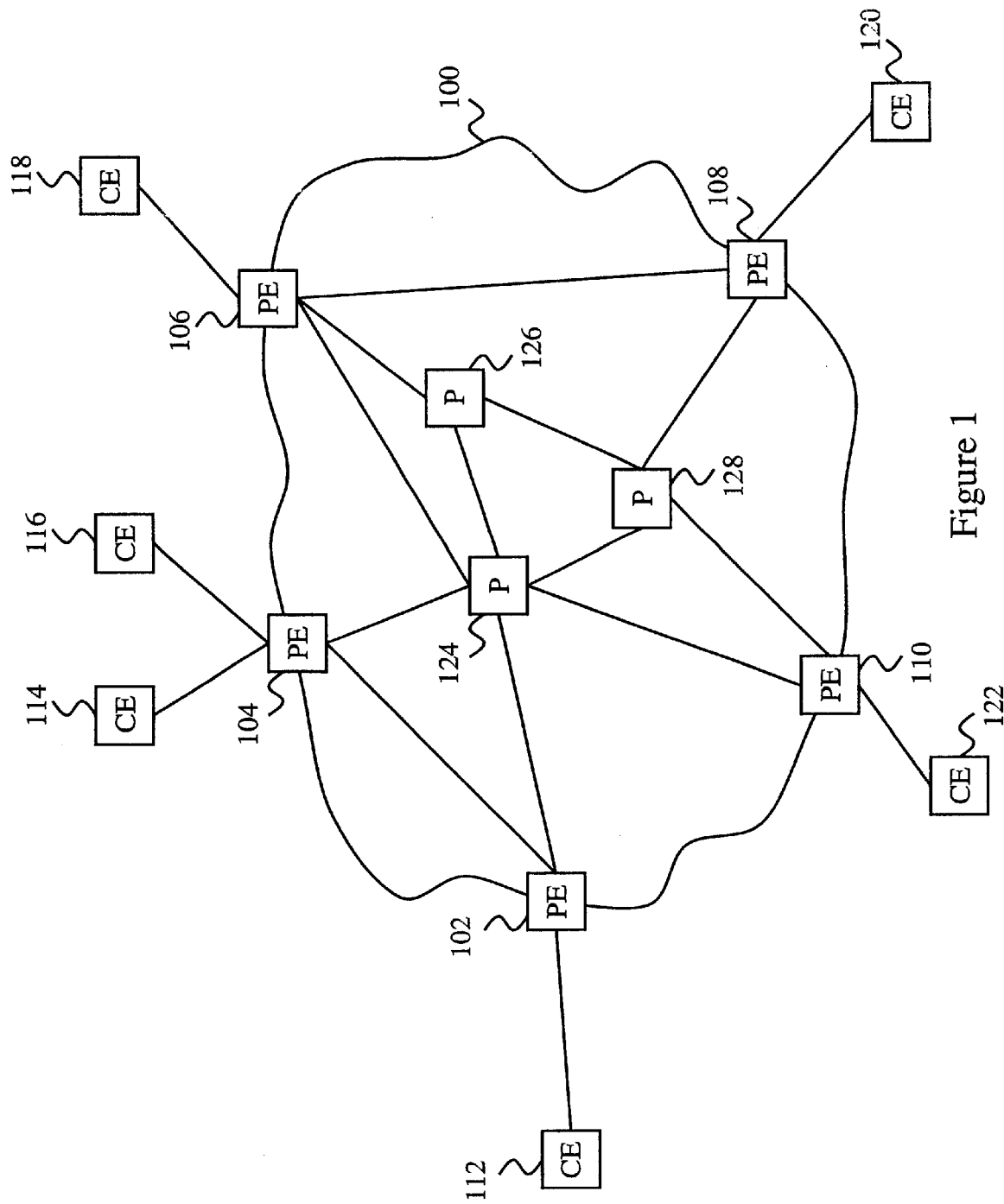
FIG. 1 illustrates a diagram of a network in which the present invention may be implemented.

FIG. 1 illustrates a block schematic diagram of a network domain (also referred to as a network "cloud") 100 in which the present invention may be implemented. The network 100 includes edge equipment (also referred to as provider equipment or, simply, "PE") 102, 104, 106, 108, 110 located at the periphery of the domain 100. Edge equipment 102–110 may each communicate with corresponding ones of external equipment (also referred to as customer equipment or, simply, "CE") 112, 114, 116, 118, 120 and 122 and may also communicate with each other via network links. As shown in FIG. 1, for example, edge equipment 102 is coupled to external equipment 112 and to edge equipment 104. Edge equipment 104 is also coupled to external equipment 114 and 116. In addition, edge equipment 106 is coupled to external equipment 118 and to edge equipment 108, while edge equipment 108 is also coupled to external equipment 120. And, edge equipment 110 is coupled to external equipment 122.

The external equipment 112–122 may include equipment of various local area networks (LANs) that operate in accordance with any of a variety of network communication protocols, topologies and standards (e.g., PPP, Frame Relay, Ethernet, ATM, TCP/IP, token ring, etc.). Edge equipment 102–110 provide an interface between the various protocols utilized by the external equipment 112–122 and protocols utilized within the domain 100. In one embodiment, communication among network entities within the domain 100 is performed over fiber-optic links and accordance with a high-bandwidth capable protocol, such as Synchronous Optical NETwork (SONET) or Gigabit Ethernet (e.g., 1 Gigabit or 10 Gigabit). In addition, a unified, label-switching (sometimes referred to as "label-swapping") protocol, for example, multi-protocol label switching (MPLS), is preferably utilized for directing data throughout the network 100.

Internal to the network domain 100 are a number of network switches (also referred to as provider switches, provider routers or, simply, "P") 124, 126 and 128. The switches 124–128 serve to relay and route data traffic among the edge equipment 102–110 and other switches. Accordingly, the switches 124–128 may each include a plurality of ports, each of which may be coupled via network links to another one of the switches 124–128 or to the edge equipment 102–110. As shown in FIG. 1, for example, the switches 124–128 are coupled to each other. In addition, the switch 124 is coupled to edge equipment 102, 104, 106 and 110. The switch 126 is coupled to edge equipment 106, while the switch 128 is coupled to edge equipment 108 and 110. Note that the edge equipment 102–110 and switches 124–128 may be referred to as network "nodes".

It will be apparent that the particular topology of the network 100 and external equipment 112–122 illustrated in FIG. 1 is exemplary and that other topologies may be utilized. For example, more or fewer external equipment, edge equipment or switches may be provided. In addition, the elements of FIG. 1 may be interconnected in various different ways.

The scale of the network 100 may vary as well. For example, the various elements of FIG. 1 may be located within a few feet or each other or may be located hundreds of miles apart. Advantages of the invention, however, may be best exploited in a network having a scale on the order of hundreds of miles. This is because the network 100 may facilitate communications among customer equipment that uses various different protocols and over great distances. For example, a first entity may utilize the network 100 to communicate among: a first facility located in San Jose, Calif.; a second facility located in Austin, Tex.; and third facility located in Chicago, Ill. A second entity may utilize the same network 100 to communicate between a headquarters located in Buffalo, N.Y. and a supplier located in Salt Lake City, Utah. Further, these entities may use various different network equipment and protocols. Note that long-haul links may also be included in the network 100 to facilitate, for example, international communications.

The network 100 may be configured to provide allocated bandwidth to different user entities. For example, the first entity mentioned above may need to communicate a greater amount of data between its facilities than the second entity mentioned above. In which case, the first entity may purchase from a service provider a greater bandwidth allocation than the second entity. For example, bandwidth may be allocated to the user entity by assigning various channels (e.g., OC-3, OC-12, OC-48 or OC-192 channels) within SONET STS-1 frames that are communicated among the various locations in the network 100 of the user entity's facilities.

Generally, a packet transmitted by a piece of external equipment 112–122 (FIG. 1) is received by one of the edge equipment 102–110 (FIG. 1) of the network 100. For example, a data packet may be transmitted from customer equipment 112 to edge equipment 102. This packet may be accordance with any of a number of different network protocols, such as Ethernet, ATM, TCP/IP, etc.

Once the packet is received, the packet may be de-capsulated from a protocol used to transmit the packet. For example, a packet received from external equipment 112 may have been encapsulated according to Ethernet, ATM or TCP/IP prior to transmission to the edge equipment 102.

Generally, edge equipment 112–120 that receives a packet from external equipment will not be a destination for the data. Rather, in such a situation, the packet may be delivered to its destination node by the external equipment without requiring services of the network 100. In which case, the packet may be filtered by the edge equipment 112–120. Assuming that one or more hops are required, the network equipment (e.g., edge equipment 102) determines an appropriate label switched path (LSP) for the packet that will route the packet to its intended recipient. For this purpose, a number of LSPs may have previously been set up in the network 100. Alternately, a new LSP may be set up. The LSP may be selected based in part upon the intended recipient for the packet. A label may then be appended to the packet to identify a next hop in the LSP.

Figure 2:
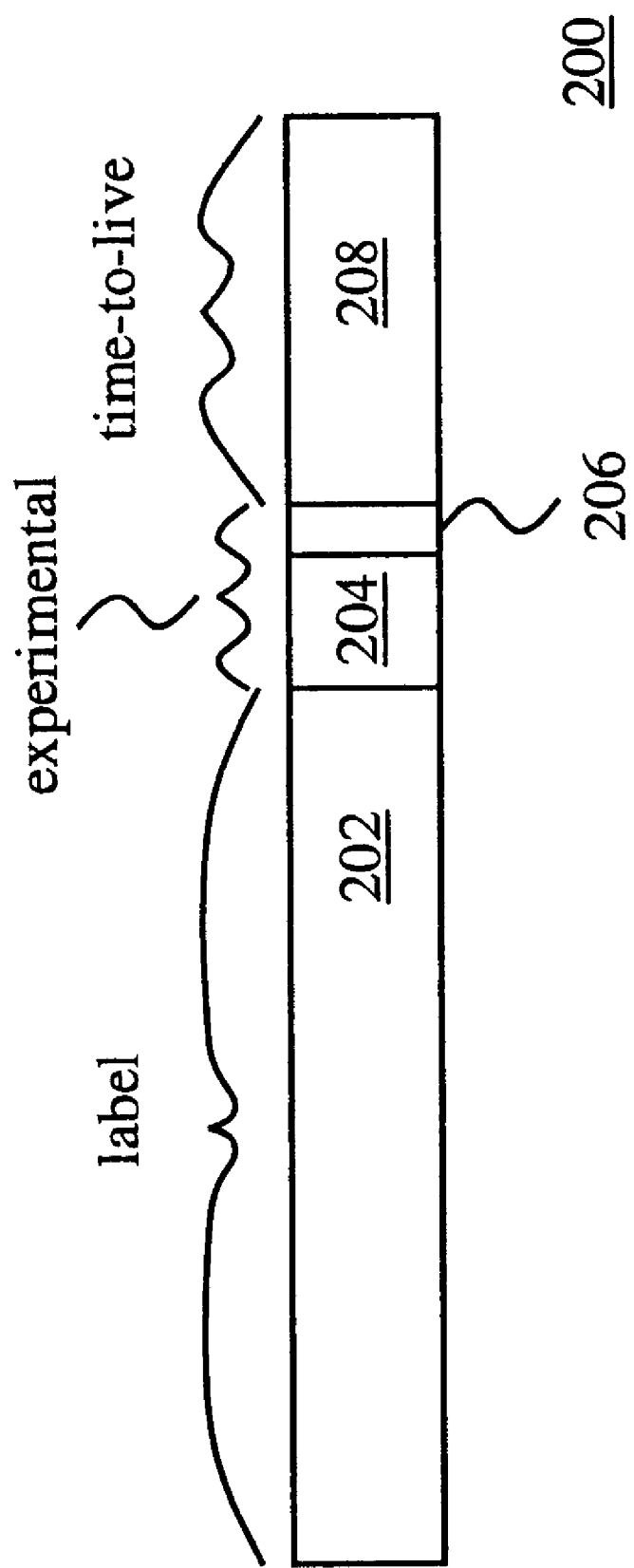
FIG. 2 illustrates a packet label that can be used for packet label switching in the network of FIG. 1.

FIG. 2 illustrates a packet label header 200 that can be appended to data packets for label switching in the network of FIG. 1. The header 200 preferably complies with the MPLS standard for compatibility with other MPLS-configured equipment. However, the header 200 may include modifications that depart from the MPLS standard. As shown in FIG. 2, the header 200 includes a label 202 that may identify a next hop along an LSP. In addition, the header 200 preferably includes a priority value 204 to indicate a relative priority for the associated data packet so that packet scheduling may be performed. As the packet traverses the network 100, additional labels may be added or removed in a layered fashion. Thus, the header 200 may include a last label stack flag 206 (also known as an "S" bit) to indicate whether the header 200 is the last label in a layered stack of labels appended to a packet or whether one or more other headers are beneath the header 200 in the stack. In one embodiment, the priority 204 and last label flag 206 are located in a field designated by the MPLS standard as "experimental".

Further, the header 200 may include a time-to-live (TTL) value 208 for the label 202. For example, the TTL value 208 may be set to an initial value that is decremented each time the packet traverses a next hop in the network. When the TMT value 208 reaches "1" or zero, this indicates that the packet should not be forwarded any longer. Thus, the TTL value 208 can be used to prevent packets from repeatedly traversing any loops that may occur in the network 100.

The labeled packet may then be further converted into a format that is suitable for transmission via the links of the network 100. For example, the packet may be encapsulated into a data frame structure, such as a SONET frame or a Gigabit Ethernet frame. Portions (e.g., channels) of each frame are preferably reserved for various LSPs in the network 100. Thus, various LSPs can be provided in the network 100 to user entities, each with an allocated amount of bandwidth.

Accordingly, the data received by the network equipment (e.g., edge equipment 102) may be inserted into an appropriate allocated channel in the frame along with its header 200 (FIG. 2). The packet may then be communicated within the frame along a next hop of the appropriate LSP in the network 100. For example, the frame may be transmitted from the edge equipment 102 (FIG. 1) to the switch 124 (FIG. 1).

The packet may then be received by equipment of the network 100 such as one of the switches 124–128. For example, the packet may be received by switch 124 (FIG. 1) from edge equipment 102 (FIG. 1). The data portion of the packet may be de-capsulated from the protocol (e.g., SONET) used for links within the network 100 (FIG. 1). Thus, the packet and its label header may be retrieved from the frame. The equipment (e.g., the switch 124) may swap a present label 202 (FIG. 2) with a label for the next hop in the network 100. Alternately, a label may be added, depending upon the TFL value 208 (FIG. 2) for the label header 200 (FIG. 2).

This process of passing the data from node to node repeats until the equipment of the network 100 that receives the packet is a destination for the data. When the data has reached a destination in the network 100 (FIG. 1) such that no further hops are required, the label header 200 (FIG. 2) may be removed. Then, the packet may be en-capsulated into a protocol appropriate for delivery to its destination. For example, if the destination expects the packet to have Ethernet, ATM or TCP/IP encapsulation, the appropriate encapsulation may be added. The packet or other data may then be forwarded to external equipment in its original format. For example, assuming that the packet sent by customer equipment 102 was intended for customer equipment 118, the edge equipment 106 may remove the label header from the packet, encapsulate it appropriately and forward the packet to the customer equipment 118.

Thus, a network system has been described in which label switching (e.g., MPLS protocol) may be used in conjunction with a link protocol (e.g., SONET) in a novel manner to allow disparate network equipment (e.g., PPP, Frame Relay, Ethernet, ATM, TCP/IP, token ring, etc.) the ability to communicate via a shared network resources (e.g., the equipment and links of the network 100 of FIG. 1).

Figure 3:
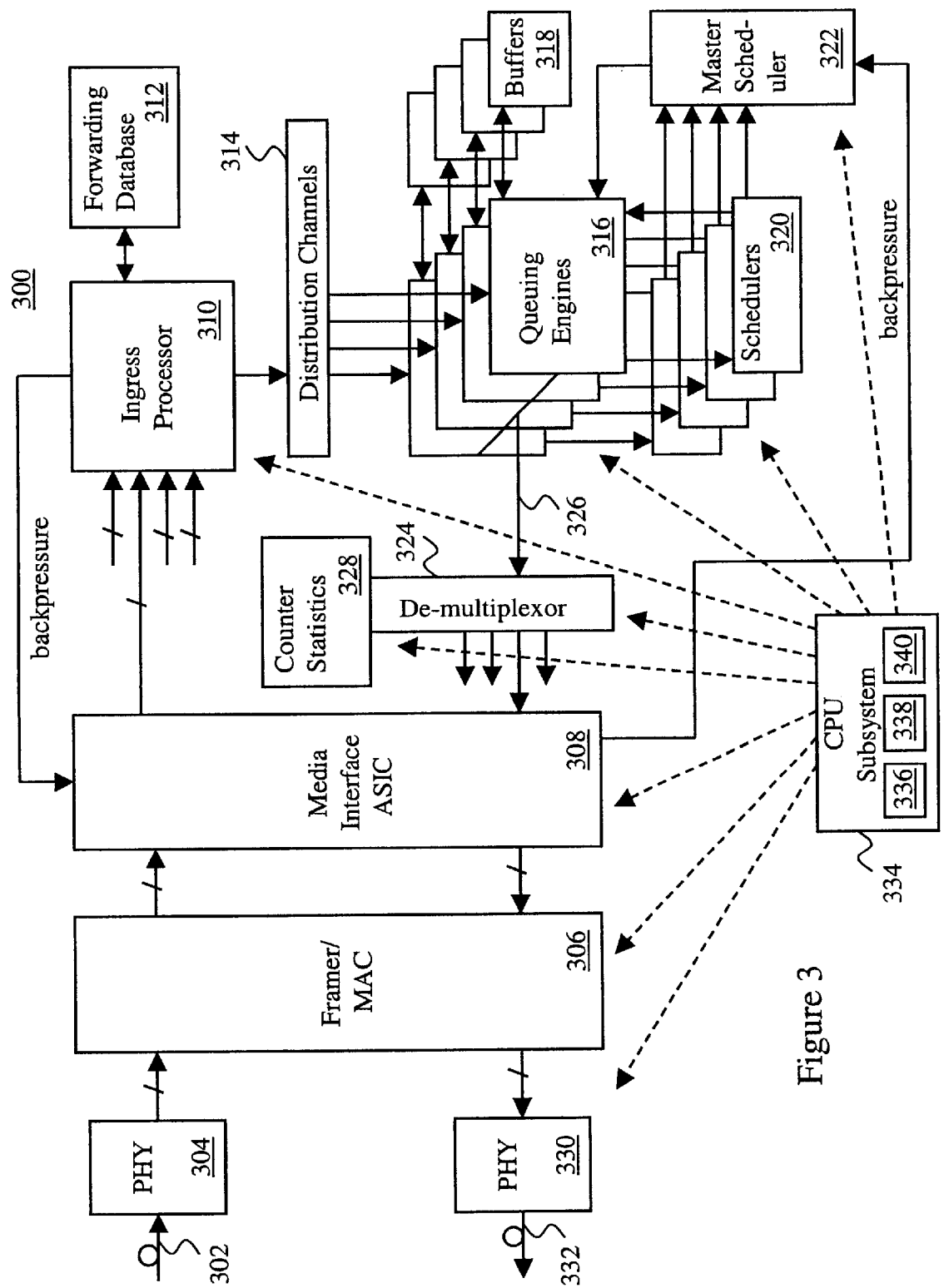
FIG. 3 illustrates a block schematic diagram of a router or switch in accordance with an aspect of the present invention.

FIG. 3 illustrates a block schematic diagram of a switch or router 300 that may be utilized as any of the switches 124, 126 and 128 or edge equipment 102–110 of FIG. 1. Referring to FIG. 3, the switch 300 includes an input port connected to a transmission media 302. For illustration purposes, only one input port (and one output port) is shown in FIG. 3, though the switch 300 includes multiple pairs of ports. Each input port may include an input path through a physical layer device (PHY) 304, a framer/media access control (MAC) device 306 and a media interface (I/F) device 308.

The PHY 304 may provide an interface directly to the transmission media 302 (e.g., the network links of FIG. 1). The PHY 304 may also perform other functions, such as serial-to-parallel digital signal conversion, synchronization, non-return to zero (NRZI) decoding, Manchester decoding, 8B/10B decoding, signal integrity verification and so forth. The specific functions performed by the PHY 304 may depend upon the encoding scheme utilized for data transmission. For example, the PHY 304 may provide an optical interface for optical links within the domain 100 (FIG. 1) or may provide an electrical interface for links to equipment external to the domain 100.

The framer device 306 may convert data frames received via the media 302 in a first format, such as SONET or Gigabit Ethernet, into another format suitable for further processing by the switch 300. For example, the framer device 306 may separate and decapsulate individual transmission channels from a SONET frame and then may identify a packet type for packets received in each of the channels. The packet type may be included in the packet where its position may be identified by the framer device 306 relative to a start-of-frame flag received from the PHY 304. Examples of packet types include: Ether-type ($V_2$); Institute of Electrical and Electronics Engineers (IEEE) 802.3 Standard; VLAN/Ether-Type or VLAN/802.3. It will be apparent that other packet types may be identified. In addition, the data need not be in accordance with a packetized protocol. For example, the data may be a continuous stream.

The framer device 306 may be coupled to the media I/F device 308. The I/F device 308 may be implemented as an application-specific integrated circuit (ASIC). The I/F device 308 receives the packet and the packet type from the framer device 306 and uses the type information to extract a destination key (e.g., a label switch path to the destination node or other destination indicator) from the packet. The destination key may be located in the packet in a position that varies depending upon the packet type. For example, based upon the packet type, the I/F device may parse the header of an Ethernet packet to extract the MAC destination address.

An ingress processor 310 may be coupled to the input port via the media I/F device 308. Additional ingress processors (not shown) may be coupled to each of the other input ports of the switch 300, each port having an associated media I/F device, a framer device and a PHY. Alternately, the ingress processor 310 may be coupled to all of the other input ports. The ingress processor 310 controls reception of data packets. Memory 312, such as a content addressable memory (CAM) and/or a random access memory (RAM), may be coupled to the ingress processor 310. The memory 312 preferably functions primarily as a forwarding database which may be utilized by the ingress processor 310 to perform look-up operations, for example, to determine which are appropriate output ports for a packet or to determine which is an appropriate label for a packet. The memory 312 may also be utilized to store configuration information and software programs for controlling operation of the ingress processor 310.

The ingress processor 310 may apply backpressure to the I/F device 308 to prevent heavy incoming data traffic from overloading the switch 300. For example, if Ethernet packets are being received from the media 302, the framer device 306 may instruct the PHY 304 to send a backpressure signal via the media 302.

Distribution channels 314 may be coupled to the input ports via the ingress processor 310 and to a plurality of queuing engines 316. In one embodiment, one queuing engine is provided for each pair of an input port and an output port for the switch 300. In which case, one ingress processor may also be provided for the input/output port pair. Note that each input/output pair may also be referred to as a single port or a single input/output port. The distribution channels 314 preferably provide direct connections from each input port to multiple queuing engines 316 and, thus, to the corresponding output ports, such that a received packet may be simultaneously distributed to the multiple queuing engines 316 via the channels 314.

Each of the queuing engines 316 is also associated with one of a plurality of buffers 318. Because the switch 300 preferably includes sixteen input/output ports for each of several printed circuit boards, referred to as "slot cards," each slot card preferably includes sixteen queuing engines 316 and sixteen buffers 318. In addition, each switch 300 preferably includes up to sixteen slot cards. Thus, the number of queuing engines 316 preferably corresponds to the number of input/output ports and each queuing engine 316 has an associated buffer 318. It will be apparent, however, that other numbers can be selected and that less than all of the ports of a switch 300 may be used in a particular configuration of the network 100 (FIG. 1).

As mentioned, packets are passed from the ingress processor 310 to the queuing engines 316 via distribution channels 314. The packets are then stored in buffers 318 while awaiting retransmission by the switch 300. For example, a packet received at one input port may be stored in any one or more of the buffers 318. As such, the packet may then be available for retransmission via any one or more of the output ports of the switch 300. This feature allows packets from various different input ports to be simultaneously directed through the switch 300 to appropriate output ports in a non-blocking manner in which packets being directed through the switch 300 do not impede each other's progress.

Figure 4:
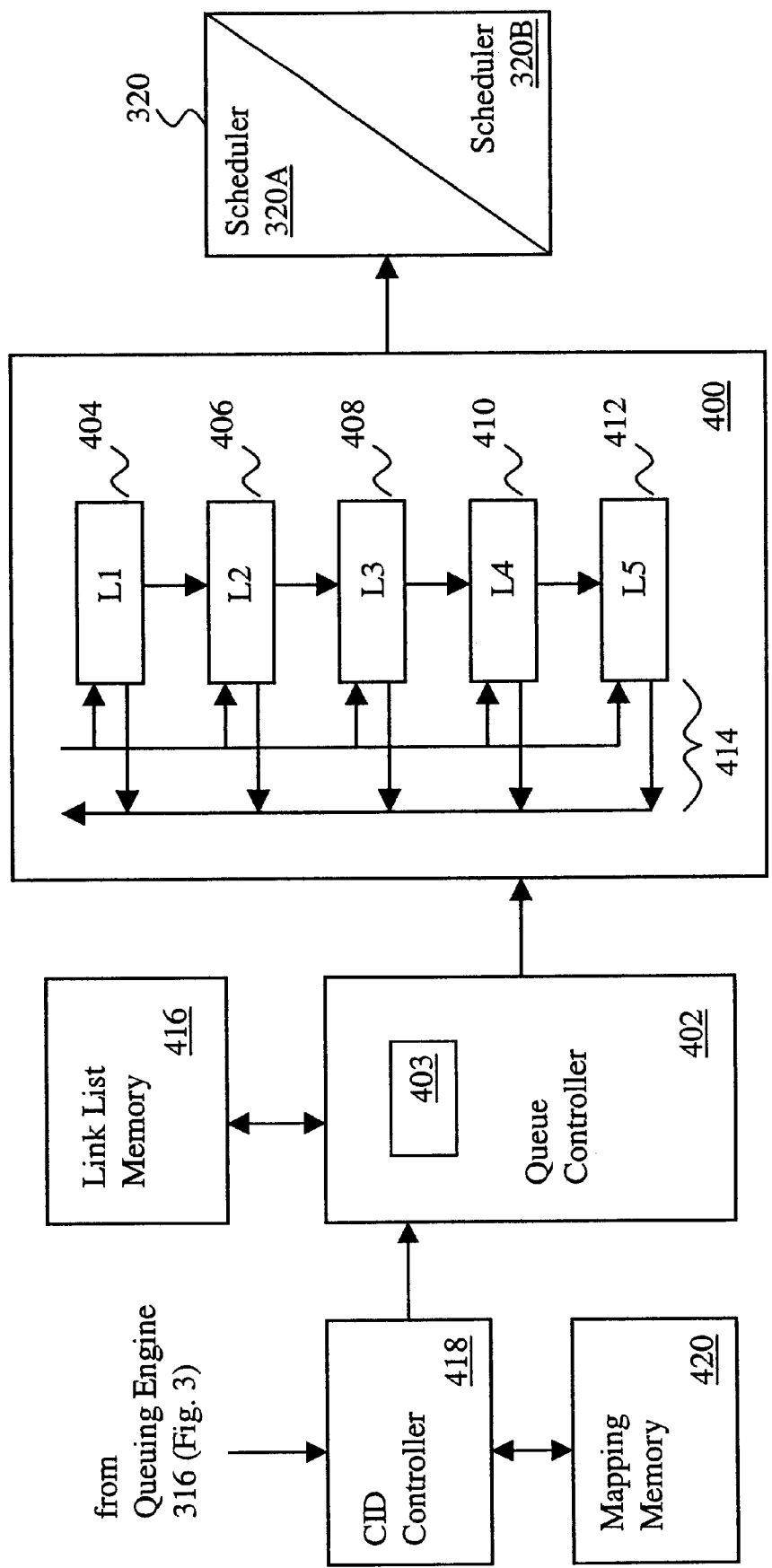
FIG. 4 illustrates a more detailed diagram of the switch of FIG. 3 including a memory for storing heap data structure in accordance with an aspect of the present invention.

For scheduling transmission of packets stored in the buffers 318, each queuing engine 316 has an associated scheduler 320. The scheduler 320 may be implemented as an integrated circuit chip. Preferably, the queuing engines 316 and schedulers 320 are provided two per integrated circuit chip. For example, each of eight scheduler chips may include two schedulers 320A and 320B (FIG. 4). Accordingly, assuming there are sixteen queuing engines 316 per slot card, then sixteen schedulers 320A-B are preferably provided.

Each scheduler 320A or 320B may prioritize packets by selecting the most eligible packet stored in its associated buffer 318. In addition, a master-scheduler 322, which may be implemented as a separate integrated circuit chip, may be coupled to all of the schedulers 320 for prioritizing transmission from among the then-current highest priority packets from all of the schedulers 320. Accordingly, the switch 300 preferably utilizes a hierarchy of schedulers with the master scheduler 322 occupying the highest position in the hierarchy and the schedulers 320 occupying lower positions. This is useful because the scheduling tasks may be distributed among the hierarchy of scheduler chips to efficiently handle a complex hierarchical priority scheme.

For transmitting the packets, the queuing engines 316 are coupled to the output ports of the switch 300 via demultiplexor 324. The demultiplexor 324 routes data packets from a bus 326, shared by all of the queuing engines 316, to the appropriate output port for the packet. Counters 328 for gathering statistics regarding packets routed through the switch 300 may be coupled to the demultiplexor 324.

Each output port may include an output path through a media I/F device, framer device and PHY. For example, an output port for the input/output pair illustrated in FIG. 3 may include the media I/F device 308, the framer device 306 and the input PHY 304.

In the output path, the I/F device 308, the framer 306 and an output PHY 330 essentially reverse the respective operations performed by the corresponding devices in the input path. For example, the I/F device 308 may add a link-layer encapsulation header to outgoing packets. In addition, the media I/F device 308 may apply backpressure to the master scheduler 322, if needed. The framer 306 may then convert packet data from a format processed by the switch 300 into an appropriate format for transmission via the network 100 (FIG. 1). For example, the framer device 306 may combine individual data transmission channels into a SONET frame. The PHY 330 may perform parallel to serial conversion and appropriate encoding on the data frame prior to transmission via media 332. For example, the PHY 330 may perform NRZI encoding, Manchester encoding or 8B/10B decoding and so forth. The PHY 330 may also append an error correction code, such as a checksum, to packet data for verifying integrity of the data upon reception by another element of the network 100 (FIG. 1).

A central processing unit (CPU) subsystem 334 included in the switch 300 provides overall control and configuration functions for the switch 300. For example, the subsystem 334 may configure the switch 300 for handling different communication protocols and for distributed network management purposes. In one embodiment, each switch 300 includes a fault manager module 336, a protection module 338 and a network management module 340. For example, the modules 336–340 may be included in the CPU subsystem 334 and may be implemented by software programs that control a general-purpose processor of the subsystem 334.

For scheduling transmission of packets, each switch 300 preferably utilizes a heap data structure for priority queuing. FIG. 4 illustrates diagrammatically a memory 400 for storing a heap data structure in accordance with the present invention. Also shown in FIG. 4 are a scheduler 320 (also shown in FIG. 3) and a queue controller 402 which may be coupled to the heap memory 400. The queue controller 402 places priority information for packets into the heap memory 400 and manipulates the heap so that the packets may be prioritized for retransmission. The queue controller 402 may include heap interface ports 403 for manipulating the heap memory 400. The ports 403 may include two insert ports (corresponding to each of the two schedulers 320A and 320B) and one common port for re-inserting scheduling information for a most-eligible packet back into the heap memory 400. For example, the queue controller 402 may use one of the two insert ports to insert new incoming data into the heap 400 and the third port may be used to re-insert a value back into the heap 400. The scheduler 320 removes information from the heap memory 400 for the most eligible packet (generally the highest priority packet) once the information is ready to be forwarded to the master scheduler 322 (FIG. 3) for retransmission of the corresponding packet.

The heap memory 400 may include a number of registers 404–412 arranged in a hierarchy with each assigned to a different level, e.g., levels L1–L5, within in the heap. The levels L1–L5 may indicate, for example, relative priorities for packets. A broadcast bus 414 may be used to perform read and write operations on the registers 404–412 and to move data among the registers 404–412.

Figure 5:
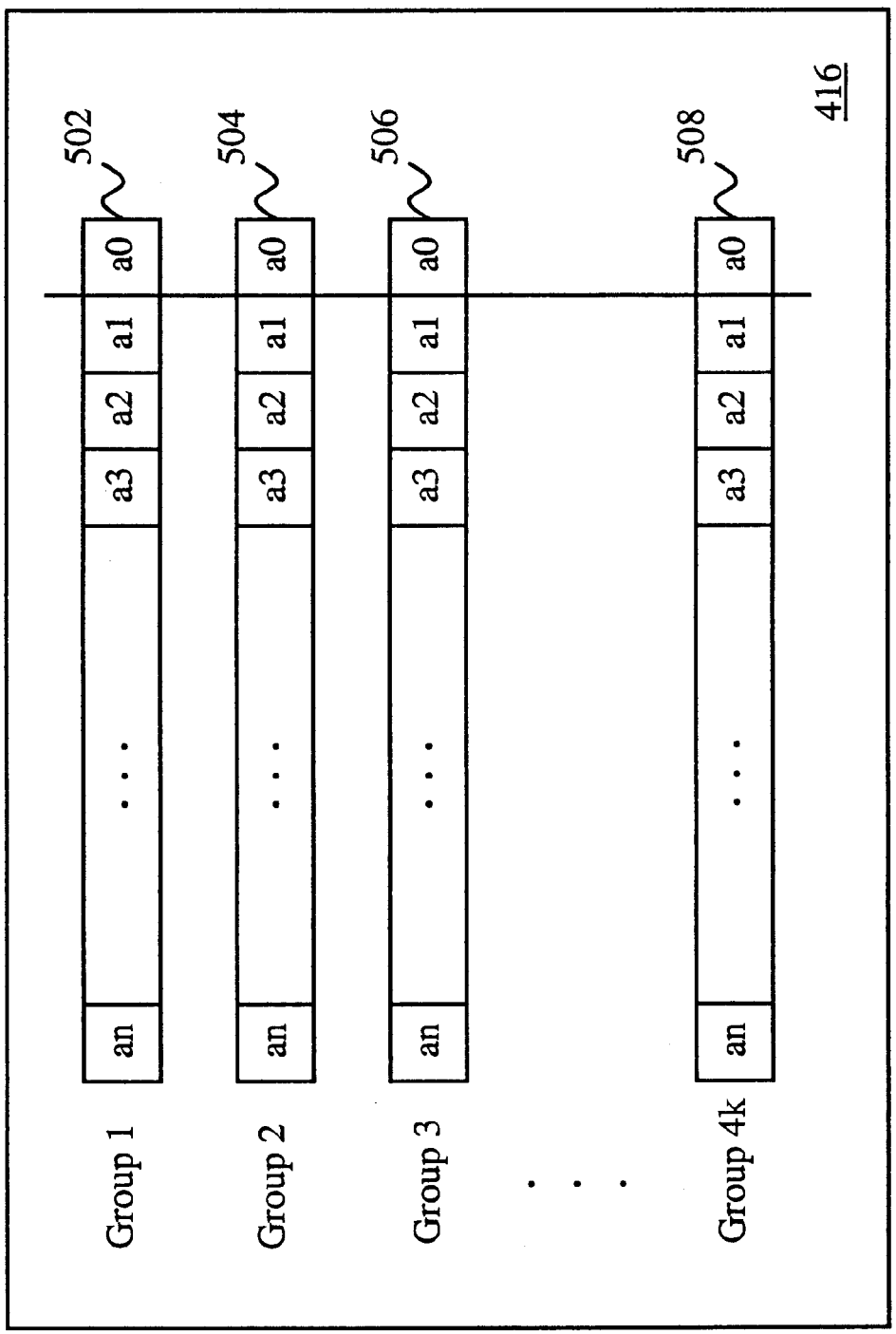
FIG. 5 illustrates a link list memory in accordance with an aspect of the present invention.

Also shown in FIG. 4 is a linked list memory 416 which may be coupled to the queue controller 402. The linked list memory 416 may store addresses and priority information for packets that are awaiting retransmission so that the packets may be accessed from the buffer 318 (FIG. 3) at appropriate times. FIG. 5 illustrates a more detailed diagram of the linked list memory 416 of FIG. 4. As shown in FIG. 5, the linked list memory 416 may be structured as a number of first-in, first-out (FIFO) registers 502–508 that are each implemented by a linked list. Each FIFO register 502–508 may correspond to a group (also referred to as a "flow") of related packets. For example, FIFO 502 may correspond to Group 1; FIFO 504 may correspond to Group 2; and so forth. In a preferred embodiment, the link list memory 416 may include 4 k (i.e. 4096) FIFOs, representing 4k groups. It will be apparent, however, that another number may be selected.

As shown in FIG. 5, each FIFO 502–508 includes a location a0 that corresponds to an earliest-received packet in the group. The location a0 may include the address in buffers 318 (FIG. 3) and priority information for a packet that is next in line (for its group) to be inserted in the heap memory 400. The remaining locations a1–an for each FIFO 502–508 may include information for packets in the corresponding group in the order in which the packets were received into the buffer 318 (FIG. 3). When the packet at position a0 is inserted into the heap memory 400, the information from the next position a1 may take its place as the earliest received packet in the group. Thus, each group or flow of related packets may be represented by one entry in the heap memory 400.

Returning to FIG. 4, a connection identifier (CID) controller 418 coupled to the queue controller 402 receives information from a queuing engine 316 (FIG. 3) regarding packets being placed into the buffer 318 by the queuing engine 316 (FIG. 3). For example, for each packet, the queuing engine 316 may provide a CID, a length, a scheduler identification and indicia of the free space available in the buffer 318. The CID may be a value assigned to each packet to identify particular data packets as belonging to a stream of data or to a related group of packets. In addition, the CID may identify the appropriate encapsulation to be used for the packet upon retransmission by the switch 300 (FIG. 3). The functions of the scheduler 320 may be divided into two somewhat independent schedulers 320A and 320B, each of which has a corresponding scheduler identification. As mentioned, the schedulers 320A and 320B may be combined into a single integrated circuit chip. In addition, because sixteen queuing engines 316 are preferably provided, two queue controllers 402 may be provided for each of eight heap memories 400, one queue controller 402 for each queuing engine 316.

The CID controller 418 may then use a mapping memory 420 coupled to the queue controller 402 to map the CID for the packet to its group or flow. Note that the CID value may be represented with sixteen bits, thus, providing up to 64k possible values. As mentioned, however, the groups or flows may have up to 4k different values and are, thus, represented by a twelve-bit number. Accordingly, the mapping memory 408 may provide a mapping of the 64k CIDs to the 4k groups or flows. Thus, at any one time, fewer than all of the possible CID values may be in use.

Figure 6:
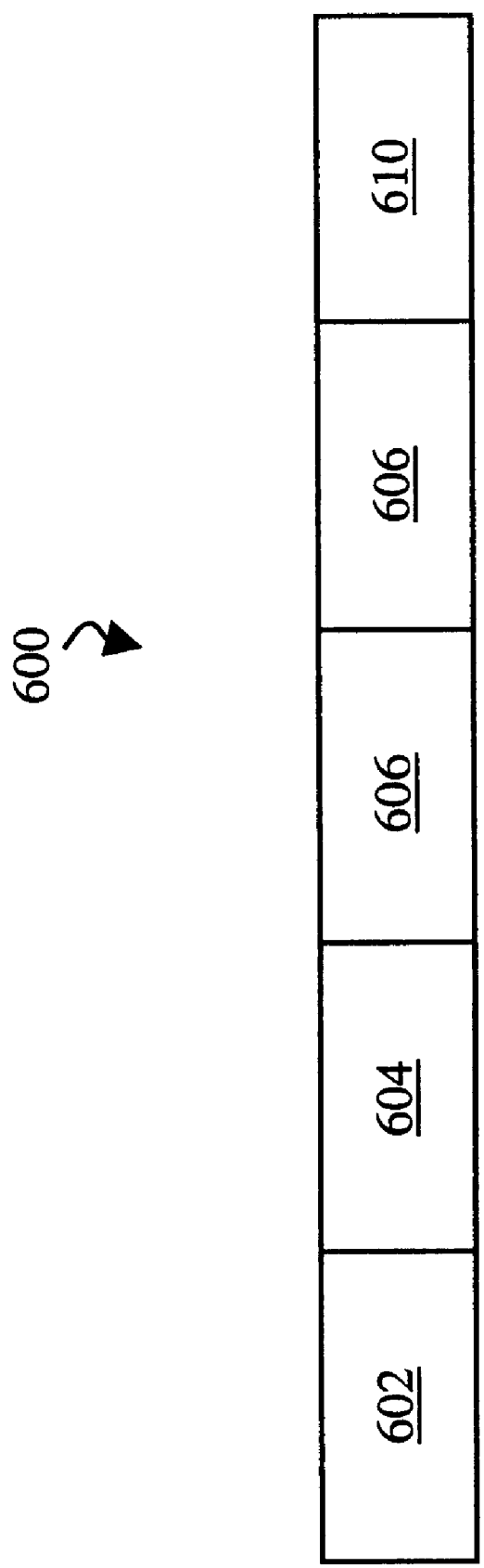
FIG. 6 illustrates a data field associated with each data packet for scheduling packets in accordance with an aspect of the present invention.

Each packet may have associated priority information used for scheduling purposes. FIG. 6 illustrates a scheduling data field 600. The scheduling data 600 may include a scheduler identification number 602; a priority value 604; a finish time 606; a group identification 608 and a starting address 610 of the packet in the buffers 318. The scheduler identification 602 may identify whether the packet is to be under control of the scheduler 320A (FIG. 4) or the scheduler 320B (FIG. 4). The priority value 604 may be used to prioritize packets to be forwarded by the switch 300 and is generally assigned to a packet based upon quality of service (QoS) requirements for the flow of which the packet is a part. For example, assigned priority values may be between zero and seven, with zero being the highest priority and seven being the lowest. The finish time 606 may indicate when the entire packet will be received into the packet buffers 318 and may also be used to prioritize packets to be forwarded by the switch 300. The queue controller 402 (FIG. 4) may compute the finish or arrival time for a packet based on the time of the packet's arrival, its length and its "weight." The weight may be inversely related to the transmission speed of the packet. As mentioned, the group identification 608 may be found from the mapping memory 420 and may be used to identify a packet as belonging to a particular data flow or group of related packets. As was also mentioned, the address 610 included in the data field 600 associates the data 600 with a particular packet in the buffers 318 (FIG. 3).

Values from the scheduling data 600 for each incoming packet may be placed into last-received positions of the appropriate FIFO 502–508 in memory 416 by the queue controller 402 (FIG. 4) while the packet itself (e.g., payload and header) may be placed in the buffers 318 (FIG. 3) by the queuing engine 316 (FIG. 3). In addition, the queue controller 402 may remove values from the first-received positions a0 of the FIFOs 502–508 of the memory 416 and place them into the heap memory 400 (FIG. 4). Once the scheduling values for a particular packet reach the top of the heap, the packet may be transmitted, for example, via an appropriate port of the switch 300 (FIG. 3). The scheduling values for the packet may then be removed from the heap memory 400 by the scheduler 320 (FIG. 4) and provided to the master scheduler 322, which then instructs the appropriate queuing engine 316 to remove the packet from the buffers 318 (FIG. 3) for retransmission. In a preferred embodiment, the placing of scheduling values into the heap memory 400 by the queue controller 402 and their removal by the scheduler 320 are performed independently.

Figure 7:
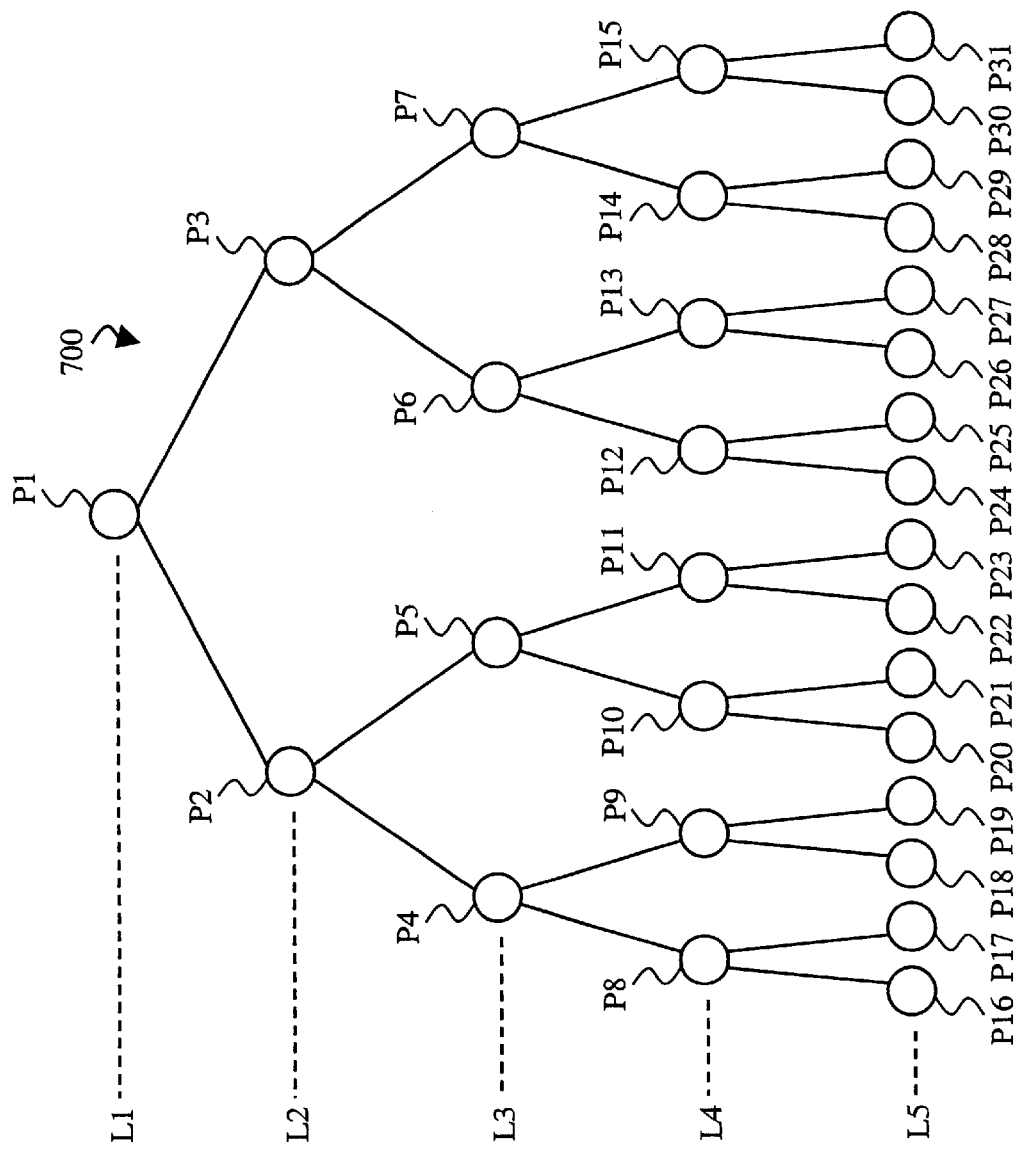
FIG. 7 illustrates a more detailed diagram of the heap of FIG. 4 showing its data structure.

FIG. 7 illustrates a more detailed diagram showing data structure of the heap 700 stored in the heap memory 400 FIG. 4. As shown in FIG. 7, the heap 700 is arranged according to priority levels with a highest level L1 at the top of the heap 700 having a single position (labeled as position P1) and each successively lower level having twice the number of positions as the preceding level. For illustration purposes, five levels are shown, including: level L1 having one position P1; level L2 having two positions P2 and P3;

level L3 having four positions P4–P7; level L4 having eight positions P8–P15; and level L5 having sixteen positions P16–P31. It will be understood, however, that a different number of levels may be utilized. For example, in one embodiment, the heap 700 includes twelve levels, the lowest level having 2K positions (i.e. 2048 positions).

For each position in the heap 700 at levels other than the lowest level, there are two positions that may be referred to as "children" of that "parent" position. These parent-child relationships are represented in FIG. 7 by lines connecting the related positions. Thus, for example, position P5 is the parent of positions P10 and P11, while positions P10 and P11 are the children of position P5. Further, position P10 is the parent of positions P20 and P21 while positions P22 and P23 are the children of position P11.

Generally, it is desired to place higher priority packets in positions that are higher in the heap 700 than those of lower priority. Preferably, if assigned priority values for packets are equal or absent, then the anticipated finish times for those packets may be used to arrange the packets in the heap 700. For example, priority values assigned to packets may be between zero and seven, with zero being the highest priority and seven being the lowest priority. The heap 700 is said to be "balanced" when each parent position has a higher priority than its children.

When the heap 700 is not completely full, priority values for packets may be inserted, preferably filling the heap 700 from left to right and from top to bottom. Emptying of the heap 700 preferably occurs in reverse, that is, from bottom to top and right to left. An aspect of the present invention provides a technique for filling the heap 700 while keeping it balanced.

Each position in the heap 700 may be expressed as, or converted to, a binary number. The binary number may be used as a "roadmap" or guide for traversing the heap 700, starting from the topmost position P1 and ending at the position that corresponds to the binary number. The most significant bit of the binary number may be ignored and the remaining bits each converted to "left" or "right" movements for travel from one level to the next lower level. For example, a "one" may be converted to a right movement and a "zero" may be converted to a left movement. Thus, for example, position P6 in the heap 700 may be expressed as "110" binary (note that 6 decimal is equal to 110 binary). Then, ignoring the most significant bit (a "1") leaves "10." Converting "10" to left and right movements yields two movements: "right, then left." Thus, to move from position P1 to position P6, the first movement is toward the right (and down one level), arriving at the position P3, since P3 is the rightmost child of P1. Then, the second movement is to the left (and down one level), arriving as desired at the position P6, since P6 is the leftmost child of P3. Note also that the number of bits in the binary number indicates the number of movements and, thus, the level of the heap 700 in which the ending position is located.

As another example, the position P22 may be converted to "10110" in binary (note that 22 decimal is equal to 10110 binary). Ignoring the most significant bit (a "1") leaves "0110," which when converted to left and right movements yields four movements: "left, then right, then right, then left." Thus, starting from the position P1, a first move is to the left (and down) to the position P2. Then from the position P2, a second move is to the right (and down) to the position P5. Then, from the position P5, a third move is to the right (and down) to the position P11. Then, from the position P11, a fourth move is to left (and down) to the position P22.

Figure 8:
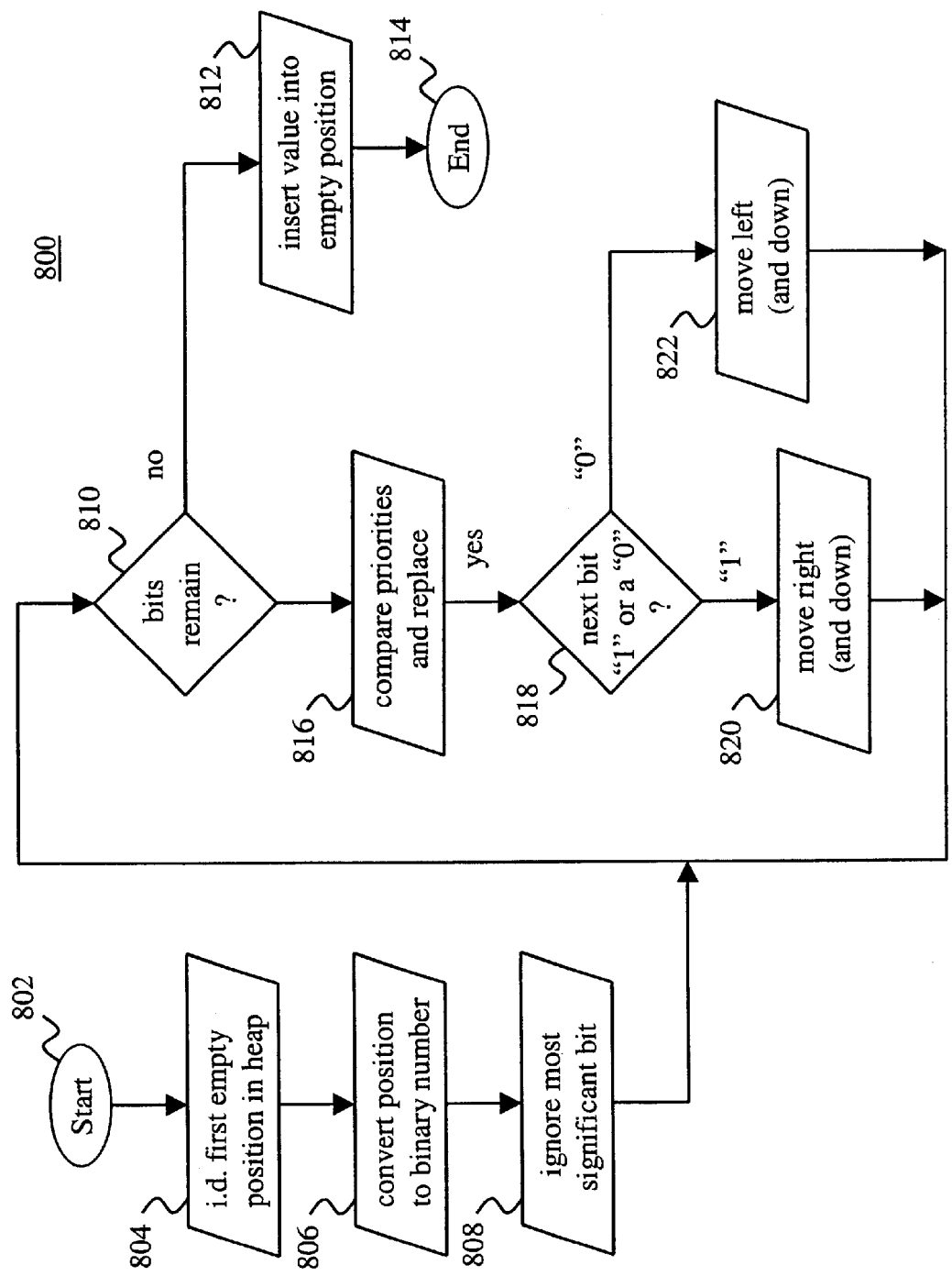
FIG. 8 illustrates a flow diagram for performing an insert instruction in accordance with an aspect of the present invention.

In accordance with the present invention, an "insert" instruction is provided for filling the heap 700 using this heap traversal technique. The insert instruction includes, e.g., as its operand, scheduling data from the field 600 (FIG. 6), such as the priority value 604 (FIG. 6) assigned to the corresponding packet. FIG. 8 illustrates a flow diagram 800 for performing the insert instruction in accordance with the present invention. The diagram 800 of FIG. 8 may, for example, control operation of the queue controller 402 of FIG. 4.

Assuming an "insert" instruction is initiated, program flow begins in a start state 802. From the state 802, program flow moves to a state 804, in which the first empty position in the heap 700 may be identified. This position may be identified based upon knowledge of the location in the heap 700 of the most recently filled position (or from knowledge of the current number of filled positions) and the general objective of filling the heap 700 from left to right and from top to bottom. Thus, referring to the heap 700 of FIG. 7, if the last position filled was, for example, position P10, then positions P1–10 can be assumed filled and the positions P11–P31 can be assumed to be empty. In which case, the first empty position is position P11, which is the adjacent and to the right of position P10. As another example, if the last filled position was position P15, the next available position is the position P16. Because there is no position to the right of position P15, the next available position is the left-most position of the next level down (i.e. position P16).

Then, from the state 804, program flow may move to a state 806. In the state 806, the number assigned to the first empty position identified in the state 804 may be converted to a binary number. For example, the position P11 may be converted to "1011." As another example, the position P16 may be converted to "10000." Note that for these conversions, leading zeros are omitted.

From the state 806, program flow may move to a state 808, in which the most significant bit may be ignored or removed from the binary number determined in the state 806. For example, the binary number "1011" may be converted to "011," while the binary number "10000," may be converted to "0000." Because leading zeros were previously omitted, the ignored or removed bit is a "1."

From the state 808, program flow moves to a state 810. In the state 810, a determination may be made as to whether the all of the movements indicated by the binary number formed in the states 806–808 have been made. This may be accomplished by determining whether all of the bits of the number have been used to direct movements within the heap 700. If so, then program flow moves to a state 812, in which the first empty position identified in the state 804 is filled. Thus, if the heap 700 is completely empty prior to the insert command, then the new value is simply placed in position P1. However, if additional movement through the heap 700 is needed, then the value placed in the first empty position may be the new value or may be a value from elsewhere in the heap 700 that is of a lower priority than the new value. This is to ensure that the heap 700 remains balanced.

Assuming, however, that in the state 810 it is determined that additional movements are required to reach the first empty position, program flow may then move to a state 816. In the state 816, a comparison may be made between a pair of priority values and the higher of the two values placed higher in the heap 700 to ensure that heap 700 remains balanced. Relative finish times may also be used to compare packets in the step 816. Thus, if the new value taken from the insert command has not yet been inserted into the heap 700, then the new value may be compared to the value in the prior position in the path of traversal through the heap 700. In the example, the new value may be initially compared to the value already stored in the position P1. The value that indicates a higher priority of these two values may then be inserted into position P1 and the other value may be retained to be placed elsewhere in the heap 700. This value may be said to be "pushed down" in the heap 700. Thus, if the new value indicates a higher priority, then the new value is inserted at position P1 and the old value from position P1 may be retained to be placed lower (pushed down) in the heap 700. However, if the new value indicates a lower priority than the value at position P1, then the new value is retained so that it can be placed lower in the heap. The retained value may become the operand in a new insert instruction to be executed at the next lower level.

From the state 816, program flow moves to a state 818. In the state 818, the first of the remaining bits may be examined to determine whether it is a "1" or "0." If the bit is a "1," then program flow moves to a state 820, in which a movement in the heap 700 may be made to the right (and down one level). Alternately, if the bit is a "0," then program flow moves to a state 822, in which a movement in the heap 700 may be made to the left (and down one level). Thus, for example, if the first empty position is position P16, then the first movement from position P1 is to the left (and down one level), arriving at the position P2.

From either state 818 or 820, program flow returns to the state 810. For the next level, the comparison made in the state 816 may be between the value held over from the prior level (e.g., the new operand) and the value at the current position. Thus, in the example, the value held over from the comparison between the new value and the value previously located in position P1 may be compared to the value already located in position P2. The higher priority value of these two values may then be inserted into position P2 and the lower priority value may be held over to be placed lower in the heap 700. This process of: comparing values; replacing the higher priority value into the heap 700; retaining the lower value as a new operand; and then moving down one level, essentially repeats until all of the movements indicated by the binary number have been completed and a value has been placed into the first empty position in the heap 700. Thus, when it is determined that no additional bits remain in the state 810, program flow may move to an end state 814.

In summary, when the heap 700 is not yet filled, empty positions remain in the lower portion of the heap 700. The "insert" instruction places new values in the heap 700 to fill these positions. To traverse the heap 700, the relative movements necessary to move from one position to another, e.g., to an empty position, can be determined from a binary number assigned to the empty position in the heap. For each level, a comparison and replacement of priority values is made to ensure that the heap 700 is balanced. This technique is useful to quickly and efficiently fill the heap 700.

Note that once a level has been traversed using the insert command, the value at that level has a higher priority than its children. This is true because a comparison will have been made between the new value (or the retained value) and the value at that position and the higher of the two values inserted at the position. Thus, as soon as a level has been traversed by the insert command, a next command, such as another insert instruction, may be initiated at the level. This is true even if a comparison of the retained value has not yet been performed at a next lower level in the heap 700. Accordingly, instructions, such as the insert instruction, can be efficiently pipelined in accordance with the present invention.

Another aspect of the present invention provides a technique for emptying the heap 700 while keeping it balanced. As the switch 300 (FIG. 3) retransmits packets, the heap 700 may be emptied by the scheduler 320 (FIGS. 3 and 4) removing scheduling data 600 (FIG. 5) that corresponds to the forwarded packets. Two different instructions may be utilized for re-inserting data values into the heap 700 in response to the scheduler 320 removing data values from the heap 700. These may include a "re-insert with new data" instruction and a "re-insert without new data" instruction.

The re-insert with new data instruction may be utilized in response to the scheduler 320 removing values from a top position (e.g., position P1 of FIG. 6) of the heap 700 when the queue controller 402 (FIG. 4) has new data (for a new packet) to add to the heap 700. In sum, the re-insert with new data instruction involves the queue controller 402 inserting data into the recently emptied position (e.g., the position P1 at the top of the heap 700) and percolating the heap 700 to ensure that it remains balanced. Percolating the heap 700 generally involves: reading both children of the position to which data was just inserted (e.g., position P1); comparing the values of the children to the value of the parent and replacing the highest priority of the three values into the parent position; dropping down one level and replacing a child with the lower priority value; and repeating these steps until the bottom of the heap 700 is reached.

The re-insert without new data instruction may be used in response to the scheduler 320 removing data 600 from the top position P1 of the heap 700 when the queue controller 402 does not have new data (for another packet) to add to the heap 700. In sum, the re-insert without new data instruction involves the queue controller 402 pulling data from a position at the bottom of the heap 700; inserting the data from the bottom of the heap 700 to the top of the heap 700; and percolating the heap 700, such as in the manner explained above, to ensure that the heap 700 remains balanced.

Figure 9:
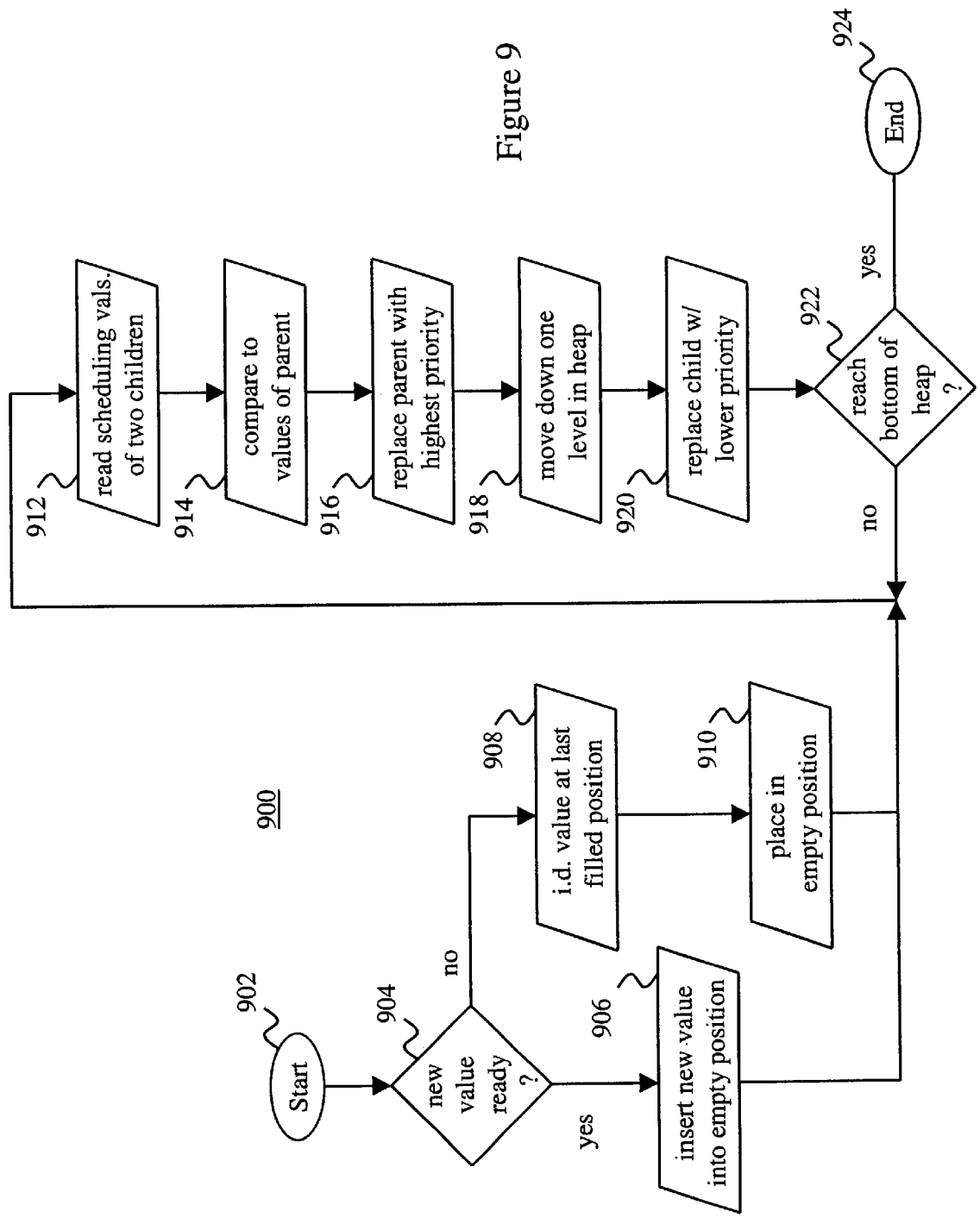
FIG. 9 illustrates a flow diagram for performing re-insert instructions in accordance with an aspect of the present invention.

FIG. 9 illustrates a flow diagram 900 for performing the re-insert instructions (with or without new data) in accordance with the present invention. The diagram 900 of FIG. 9 may, for example, govern operation of the queue controller 402 of FIG. 4.

Program flow begins in a start state 902. Assuming the scheduler 320 (FIG. 4) has removed a value from the heap 700, such as from position P1, program flow then moves to a state 904 where a determination may be made as to whether a new data value is ready for insertion to the heap 700. For example, the new value may be available from the linked list memory 416 (FIG. 4). Assuming a new value is ready, the re-insert with new data instruction may be performed. Accordingly, program flow moves to a state 906, in which the queue controller 402 may insert the new value, such as at the top of the heap 700 in position P1. The insert instruction may include, e.g., as its operand, the new value to be inserted into the heap 700. The heap 700 may then be ready for percolation to ensure that it is balanced.

Assuming, however, that no new value is ready, the re-insert without new data instruction may be performed. For example, the link list memory 416 may not yet have a data value available for insertion into the heap 700. Under these conditions, program flow moves to a state 908. In the state 908, the last filled position in the heap 700 may be identified. This position may be identified based upon knowledge of the location in the heap 700 of the most recently filled position (or from knowledge of the current number of filled positions) and the general objective of filling the heap 700 from left to right and from top to bottom. From the state 908, program flow moves to a state 910. In the state 910, the data value from the last filled position of the heap 700 may then be removed and re-inserted at the position emptied by the scheduler 320 (e.g., the top position P1). The heap 700 may then be ready for percolation to ensure that it is balanced.

Thus, from either the state 906 or the state 910, program flow moves to a state 912 to begin the percolation process. In the state 912, the data values from the two children of the position filled in the state 906 or 910 may be read. The data values read in the state 912 may include assigned priority values and anticipated finish times. Thus, where data was inserted into the position P1, the values at positions P2 and P3 may be read in the state 912. For reading these two values efficiently, the memory device 400 (FIG. 4) used for storing the heap 700 preferably has two read ports. As will be seen, however, the memory device 400 may have a single write port.

From the state 912, program flow moves to a state 914, in which. the values of the two children may be compared to the value of the parent (i.e. the position filled in the state 906 or 910). Then, in a state 916, the highest priority value of the three (i.e. the two children and the parent) may be placed into the parent position. As mentioned, relative finish times may also be compared where assigned priority values are equal or absent.

Program flow then moves to a state 918, in which operation of the instruction moves down one level in the heap 700 to the children positions that were compared in the state 914. Then, in a state 920, if one of the children was moved to the parent position in the state 916, the value from the parent position is inserted into the heap 700 at that child position. For example, assume that the priority values at positions P1, P2 and P3 are 5, 7 and 4, respectively. Then, in the state 916, the value of 4 from child position P3 may replace the value of 5 at parent position P1 since a priority of 4 indicates a higher priority than a priority of 5. Then, in the state 920, the priority value of 5 previously at the parent position P1 may be inserted at the child position P3 to occupy the position previously held by the value of 4. The value of 7 may remain at the position P2. Accordingly, this sequence of steps ensures that the parent has a higher priority than its children so as to keep the heap 700 balanced.

From the state 920, program flow moves to a state 922, in which a determination may be made as to whether the bottom of the heap 700 has been reached. If not, then program flow returns to the state 912. The process may then be repeated for the next level. Thus, returning to the example in which the priority value of 4 was moved to the position P1 and the value of 5 was moved to the position P3, the next comparison may be between the value of 5 at the position P3 and the values at its children (i.e. at positions P6 and P7). Note that there is no need to compare the value at P2 to its children; because it was not changed, it remains a higher priority value than its children.

The process of reading two values at children positions (state 912); comparing them to their parent (914); replacing the highest priority or earlier finish time into the parent position (state 916); moving down a level (state 918); and replacing a removed child, if necessary (state 920), may be repeated until the bottom of the heap 700 is reached. Then, when in the state 922, the bottom of the heap 700 is reached, program flow may terminate in an end state 924. Accordingly, the heap 700 remains balanced.

Note that, similarly to the insert command, once a level has been traversed by either of the re-insert commands, the value placed in that level will have a higher priority than its children. This is true because a comparison will have been made of the value at that position with the values at its children and the highest of the three values inserted at the parent position. For example, once level L1 has been traversed, the highest priority position (i.e. the position P1), will generally have the highest priority of all of the values in the heap 700. Thus, even if a re-insert command is still operating on a level of the heap 700, a next instruction, such as another insert instruction, can be initiated at a higher level in the heap 700. Accordingly, the instructions can be pipelined in accordance with the present invention. However, instructions should be pipelined so as to avoid interfering with each other. For example, data values that are to be read from a next level down by a re-insert instruction, such as in the state 912, should not be read by the insert instruction until after a prior instruction has finished operating on the data. In addition, the data value at the parent position should be inserted by a re-insert instruction (which requires reading its children and inserting the highest of there priorities) before the data value is read by a subsequent instruction.

FIG. 10 illustrates diagrammatically pipelining of insert and re-insert instructions in accordance with the present invention. As shown in FIG. 10, a timing diagram 1000 may include a series of four-cycle baseline windows. Each window may include one no-op instruction cycle (no operation), two insert instruction cycles, and one re-insert instruction cycle. The four cycles may be performed at a level in the heap 700 (FIG. 7) before dropping to a next level down in the heap 700 where four cycles may be repeated. This process may continue until the bottom of the heap 700 is reached. Once the four cycles have been completed at a level, a next series of four cycles may be performed at that same level.

More particularly, referring to cycle 1002 in FIG. 10, an insert instruction designated I1 may be initiated at level L1 of the heap 700 (FIG. 7). Thus, in cycle 1002, packet scheduling information 600 from the memory 416 (FIG. 4) may be compared to a value already in the heap 700 at a position in level L1; and, the higher of the two values inserted at the position in level L1. The lower value may be retained to be inserted elsewhere in the heap 700.

Then, in cycle 1004, a second insert instruction, designated I2, may be initiated at level L1 of the heap 700 (FIG. 7). Thus, in cycle 1004, scheduling information for a second packet may be compared to the value in the heap at the position of level L1 (e.g., the value inserted in cycle 1002). The higher priority of these two values may be inserted into the position at level L1 and the lower priority value may be retained to be inserted elsewhere in the heap 700. Thus, after completion of cycles 1002 and 1004, there may be priority information for two different packets awaiting comparison to values at level L2 and insertion into the heap 700 at level L2 or lower.

Then, in cycle 1006, a re-insert instruction (with or without new data, depending on the availability of new data in the memory 416) may be initiated at level L1 of the heap 700. This assumes that data had previously been removed from the heap 700 by the scheduler 320 (FIG. 4) so as to leave an open position at level L1 of the heap 700. Thus, where a re-insert with new data instruction is performed in cycle 1006, the new data from the memory 416 (FIG. 4) may be inserted into the empty position at level L1. And, where a re-insert without new data instruction is performed in cycle 1006, the data pulled from the bottom of the heap 700 may be inserted into the empty position at level L1.

Simultaneously with the cycle 1006, a no-op cycle 1008 may be performed at level L2. This prevents any instructions from operating on the children positions in level L2 that may need to be read during the cycle 1006 in order to determine which value of the two children or parent at level L1 is of higher priority for the re-insert instruction initiated in the cycle 1006.

Then, during cycle 1010, the insert instruction initiated in cycle 1002 may be executed at level L2. Similarly, in a next cycle 1012, the insert instruction initiated in cycle 1004 may be carried out at level L2. Then, during a next cycle 1014, the re-insert instruction initiated in cycle 1006 may be executed at level L2.

Also during the cycle 1014, the four-cycles may begin again at level L3. Thus, cycle 1016 may be a no-op for level L3, while cycles 1018, 1020 and 1022 may carry out the insert and re-insert instructions initiated in level L1 for level L3.

This process may continue at level L4 beginning with no-op cycle 1024, and for each additional level until the bottom of the heap 700 (FIG. 7) is reached. In addition, as illustrated in FIG. 11, the four cycles may be repeated at each level. FIG. 11 illustrates additional cycles for the timing diagram of FIG. 10. Note that during some insert cycles (e.g., cycles 1002 or 1004) there will not be scheduling data available in the memory 416 (FIG. 4) or the heap 700 may be full. In which case, a cycle may be skipped. Similarly, for some re-insert cycles (e.g., cycle 1006) there will not be space made available by the scheduler 320 (FIG. 4) pulling data from the heap 700. Also, in this case, a cycle may be skipped, i.e. replaced with a no-op cycle. Assuming a cycle is skipped at level L1, then the corresponding cycles at lower levels may also be skipped. While a skipped cycle is wasted as being unused, this inefficiency is thought to be outweighed by efficiency benefits of pipelined instructions in accordance with the invention.

Another aspect of the invention provides a technique for partitioning the scheduling heap 700 (FIG. 7) to support multiple output channels. The physical memory device 400 (FIG. 4) that includes the heap 700 may be adapted to encompass plural smaller, included heaps. by assigning a highest level of each included heap to a lower level in the encompassing heap 700. This is useful because a single memory 400 can be adapted to prioritized packets of various different transmission protocols and speeds. Further, this adaptation can be performed on an as needed, ongoing basis.

Recall that each slot card may include eight scheduler chips 320 (each of which includes schedulers 320A and 320B), and a corresponding eight heap memories 400, sixteen queue controllers 402, sixteen queuing engines 316 (FIG. 3), sixteen buffers 318 (FIG. 3) and one master scheduler 322 (FIG. 3). In a preferred embodiment, the available communication bandwidth for a slot card may preferably be allocated among various ports and channels as needed, for example, to support various different levels of service for user entities. The available bandwidth for a slot card may be, for example, approximately 10 Gigabits per second (10 Gbps). Further, assuming that communication among network entities within the network domain 100 (FIG. 1) is performed in accordance with Synchronous Optical NETwork (SONET), this bandwidth may be allocated among ports or channels by assigning various channels within SONET STS-1 frames (e.g., OC-3, OC-12, OC-48 or OC-192 channels).

An OC-192 channel requires virtually all of this available 10 Gbps bandwidth. Accordingly, a slot card may be configured to support a single 10 Gbps channel. In which case, each of the eight heap memories 400 (FIG. 4) of the slot card may be utilized to prioritize packets for such a channel (prior to passing scheduling data to the master scheduler 322 for prioritizing among the data from the eight heap memories 400).

Figure 12:
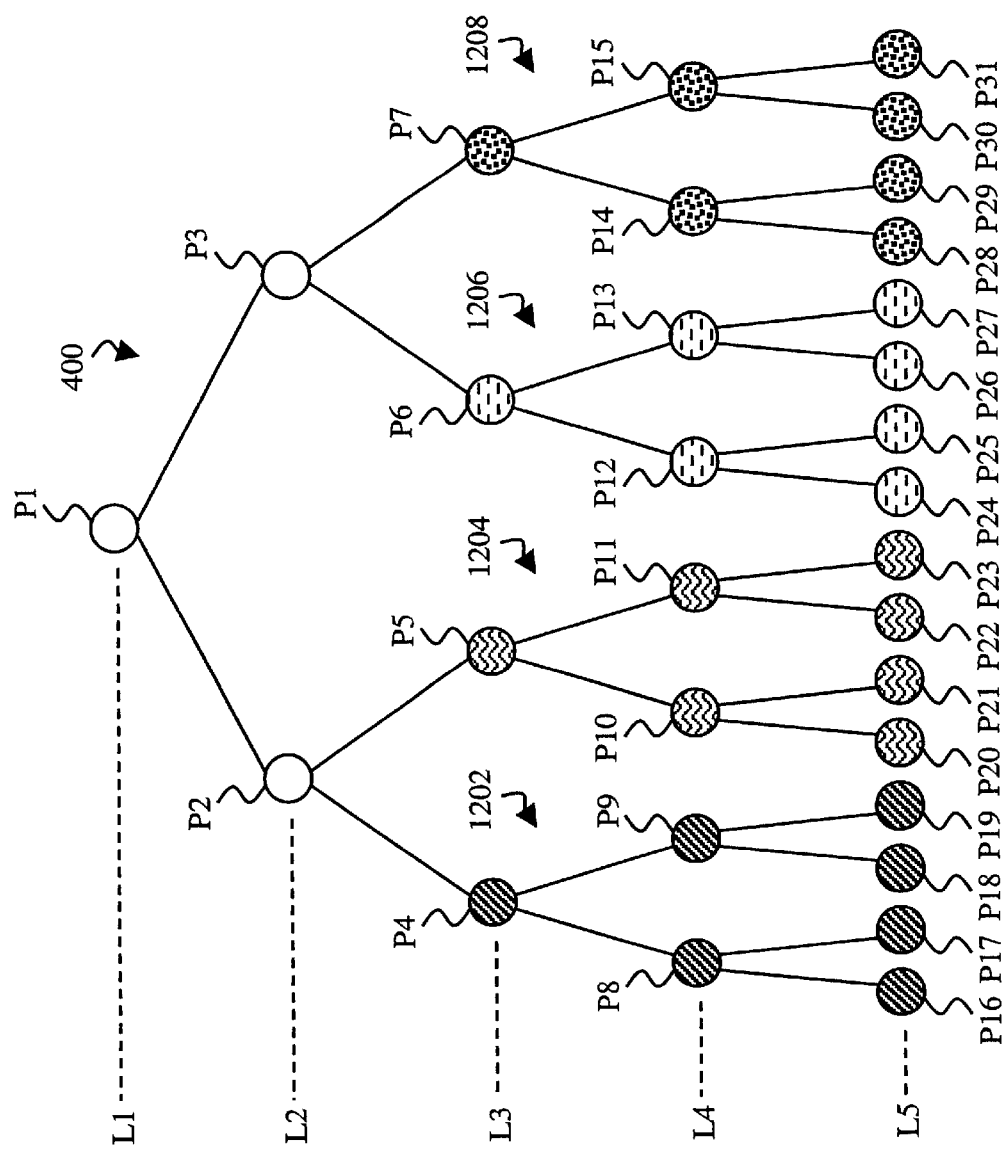
FIG. 12 illustrates the heap of FIG. 7 partitioned into four smaller heaps of equal size.

A slot card, however, may also be configured to support various different numbers of channels with various different bandwidth capacities. As a specific example, a slot card may support four OC-48 channels, since four OC-48 channels require a combined bandwidth that is equal to that of one OC-192 channel. FIG. 12 illustrates the heap 700 (FIG. 7) partitioned into four smaller heaps of equal size. Thus, the partitioning shown in FIG. 12 may be utilized to support four OC-48 channels. Note that any of the eight heap memories 400 of the slot card may be partitioned as shown in FIG. 12.

As mentioned, the heap 700 preferably extends beyond levels L1–L5, however, such additional levels are not shown in FIG. 12 for illustration purposes. For the partitioning of FIG. 12, levels L1 and L2 are not used by any included heap and, thus, the positions in those levels are illustrated by blank circles. Accordingly, the highest priority level is level L3. At level L3, position P4 serves as the highest priority for a first included heap 1202 (the positions of the first heap are illustrated by circles filled by diagonal lines); position P5 serves as the highest priority position for a second included heap 1204 (the positions of the second heap are illustrated by circles filled by zig-zag lines); position P6 serves as a highest priority position for a third included heap 1206 (the positions of the third heap are illustrated by circles filled by horizontal dashed lines); and position P7 serves as a highest priority position for a fourth included heap 1208 (the positions of the fourth heap are illustrated by circles filled by dots). Because level L3 is the highest priority for each included heap, scheduling data 600 (FIG. 6) for packets may be inserted directly into level L3, such as by performing insert and re-insert (with or without new data) instructions. Scheduling data 600 may also be removed directly from level L3 by the scheduler 320 (FIGS. 3–4).

Figure 13:
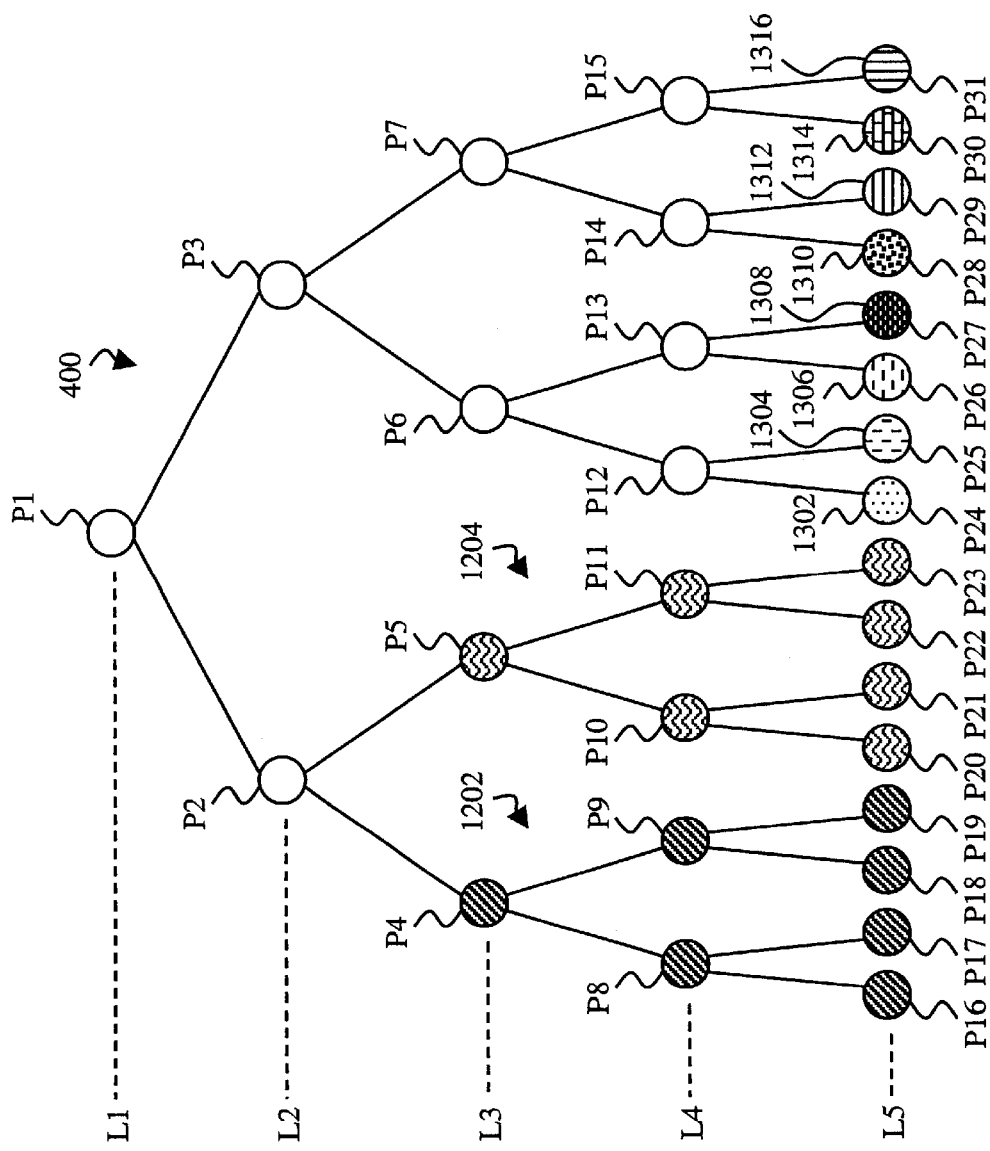
FIG. 13 illustrates the heap of FIG. 7 partitioned into ten smaller heaps of various sizes.

A slot card may be configured to support another combination of channels, so long as their aggregate bandwidth does not exceed the maximum available. For example, two OC-48 channels and eight OC-12 channels have an aggregate bandwidth equal to one OC-192 channel. FIG. 13 illustrates the heap 700 partitioned into ten smaller included heaps of various sizes, such as to support two OC-48 channels and eight OC-12 channels. As illustrated in FIG. 13, position P4 serves as a highest priority position for a first included heap 1202 that may support an OC-48 channel; position P5 serves as a highest priority position for a second included heap 1204 that may support an OC-48 channel; and positions P24–P31 each serve as a highest priority position for each of eight included heaps 1302–1316 that may each support one of eight OC-12 channels. As mentioned, the heap 700 preferably extends to lower levels beyond levels L1–L5, however, such additional levels are not shown in FIG. 13. In addition, it will be apparent that other combinations are possible, including the use of OC-3 channels. Further, bandwidth may be left idle if not needed. As such, the heap 700 need not be fully utilized.

For performing the insert and re-insert instructions in a pipelined manner for a partitioned heap, instruction cycles may be interleaved such that each partition receives a sufficient proportion of the cycles to fulfill its bandwidth obligations. For example, referring to the partitioning scheme of FIG. 12 in which four partitions 1202, 1204, 1206 and 1208 are provided, four-cycle baseline windows (as shown and described with reference to FIG. 10), may be interleaved for the partitions. Insert operations are performed in response to incoming packets. Thus, the insert operations of each baseline window are preferably performed for any of the partitions (and for any port). However, re-insert operations are in response to sending a packet. Accordingly, the re-insert operations are allocated to the individual partitions according to their bandwidth obligations. Thus, a first set of four instruction cycles may be performed at level L3, including for example, two insert instruction cycles (for any port), one re-insert instruction cycle (in the partition 1202) and one no-op cycle. Then, a second set of instruction cycles may be performed at level L3, with the reinsert operation allocated to the partition 1204. Next, a third set of instructions cycles may be performed at level L3, with the reinsert operation allocated to the partition 1206. Then, a fourth set of instruction cycles may be performed at level L3, with the reinsert operation allocated to the partition 1208. Next, a fifth set of instruction cycles may be performed at level L3, with the reinsert operation allocated to the partition 1202. Simultaneously with performing the fifth set of instruction cycles at level L3, with the reinsert operation allocated to the partition 1202, the instruction cycles initiated in the first set may be operating at level L4. This process may thus continue in an interleaved and pipelined fashion.

Figure 14:
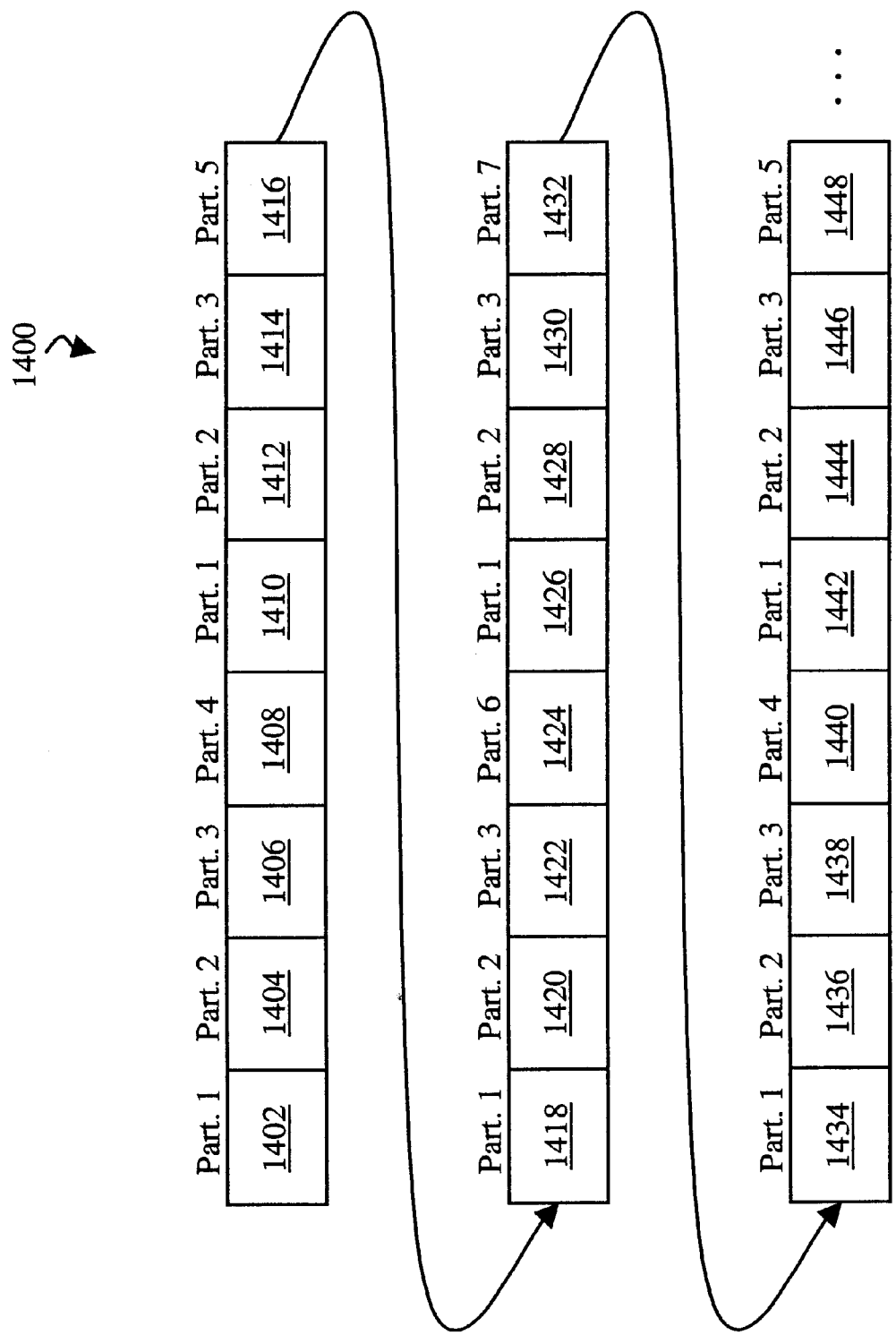
FIG. 14 illustrates an exemplary timing diagram for allocating instruction cycles for a partitioned heap in an interleaved and pipelined manner in accordance with an aspect of the present invention.

Because the bandwidth obligations are equal for each partition in FIG. 12, each preferably receives an equal number of instruction cycles. However, for partitioning schemes in which the bandwidth obligations differ among the partitions, then the instruction cycles may be apportioned in accordance with the bandwidth requirements. FIG. 14 illustrates an exemplary timing diagram for allocating instruction cycles for a partitioned heap in an interleaved and pipelined manner in accordance with the present invention. In this example, assume that the heap 700 (FIG. 7) is partitioned to provide three OC-48 channels (designated in FIG. 14 as Partitions 1–3) and four OC-12 channels designated in FIG. 14 as Partitions 4–7). This gives a total of seven channels with a combined bandwidth that is equivalent to one OC-192 channel. However, each OC-48 channel carries essentially four times the data traffic as each OC-12 channel. Thus, each heap partition that supports an OC-48 channel preferably receive four times the number of instruction cycles as each heap partition that supports an OC-12 channel.

Referring to FIG. 14, a first four-cycle instruction window 1402 may be dedicated to Partition 1, which supports a first of the OC-48 channels. Immediately after the cycles 1402, a second four-cycle instruction window 1404 occurs. The second window 1404 may be dedicated to Partition 2, which supports a second of the OC-48 channels. Then, a third window 1406 may be dedicated to Partition 3, which supports the third OC-48 channel. Next, a fourth window 1408 may be dedicated to Partition 4, which supports an OC-12 channel.

Then, in windows 1410–1414, instruction cycles may be dedicated to each of the OC-48 partitions, respectively. Next, window 1416 is dedicated to partition 5, a second OC-12 channel. As can be seen for windows 1418–1448, for every four windows, one is dedicated to each of the three OC-48 channels, while one is dedicated to the four OC-12 channels. Thus, for every sixteen windows, four are dedicated to Partition 1; four are dedicated to Partition 2; four are dedicated to Partition 3; and one is dedicated to each of Partitions 4–7. This creates a pattern according to which the partitions receive instruction cycles: 1 . . . 2 . . . 3 . . . 4 . . . 1 . . . 2 . . . 3 . . . 5 . . . 1 . . . 2 . . . 3 . . . 6 . . . 1 . . . 2 . . . 3 . . . 7 . . . 1 . . . 2 . . . 3 . . . 4 . . . 1 . . . 2 . . . 3 . . . 5 . . . , etc. As a result, each partition receives a number of cycles that is proportional to the bandwidth supported by the partition. It will be apparent that other patterns of instruction cycle apportionment may be used for other heap partitioning schemes. For example, the pattern: 1 . . . 2 . . . 3 . . . 4 . . . 1 . . . 2 . . . 3 . . . 4 . . . 1 . . . 2 . . . 3 . . . 4 . . . 1 . . . 2 . . . 3 . . . 4 . . . 1 . . . 2 . . . 3 . . . 4 . . . 1 . . . 2 . . . , etc. may be used for the partitioning scheme of FIG. 12. And, the pattern: 1 . . . 2 . . . 3 . . . 4 . . . 1 . . . 2 . . . 5 . . . 6 . . . 1 . . . 2 . . . 7 . . . 8 . . . 1 . . . 2 . . . 9 . . . 10 . . . 1 . . . 2 . . . 3 . . . 4 . . . 1 . . . 2 . . . 5 . . . 6 . . . , etc. may be used for the scheme of FIG. 13.

Thus, a technique for partitioning the heap 700 to support channels of various different bandwidths has been described. A technique for pipelining and interleaving instruction cycles for a partitioned heap has also been described.

According to a further aspect, a hierarchical implementation of a Quality of Service (QoS) function is provided. As mentioned, up to sixteen slot cards may be fully connected to each other. For prioritizing packets for retransmission, each slot card preferably includes eight heap memories 400 (FIG. 4) and a corresponding eight scheduler chips 320, each of which may include two schedulers 320A and 320B, and one master scheduler 322. Each scheduler 320 selects the most eligible packet from its associated heap 700 (FIG. 7). The master scheduler 322 determines the prioritization among the packets selected by the schedulers 320. Thus, schedulers 320, 322 are arranged in a hierarchy with the sixteen schedulers 320A and 320B at a first level and the master scheduler 322 at a higher level.

Figure 15:
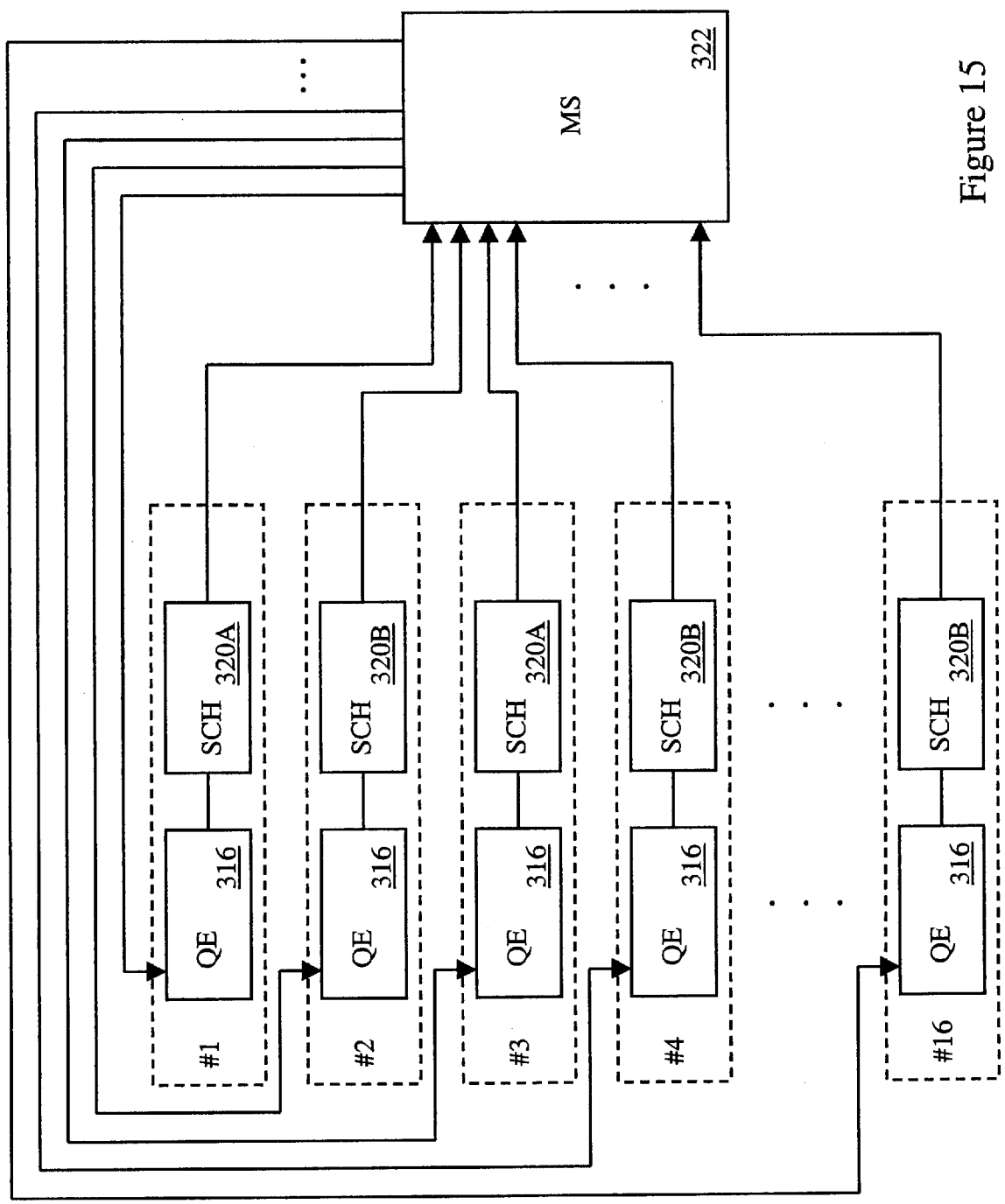
FIG. 15 illustrates eight queuing engines, their associated schedulers and a master scheduler arranged in a hierarchy of schedulers in accordance with an aspect of the present invention.

FIG. 15 illustrates sixteen queuing engines 316, their associated schedulers 320A and 320B and a master scheduler 322 arranged in a hierarchy of schedulers in accordance with the present invention. Pairings of a queuing engine 316 and a scheduler 320 are numbered #1–#16 in FIG. 15. As was previously explained, scheduling data 600 (FIG. 6) obtained via the queuing engines 316 is provided to the schedulers 320. The schedulers 320, in turn, are coupled to the master scheduler 322 for identifying a most eligible packet to the master scheduler 322. For example, each of the eight schedulers 320 (or sixteen schedulers 320A and 320B) may provide scheduling data 600 obtained from the top of the heap 700 (FIG. 7) to the master scheduler 322. The master scheduler 322 may then select the most eligible among the packets identified by the schedulers 320. For example, the master scheduler 322 may compare priority values 604 of the up to sixteen packets received from the schedulers 320 and select the highest priority of them to be queued for retransmission. Then, the master scheduler 322 may select the next highest priority packet to be queued for retransmission.

Thus, a technique has been described for scheduling retransmission of packets using a hierarchy of schedulers. This is useful because the scheduling tasks are distributed among the hierarchy of schedulers to efficiently handle a complex hierarchical priority scheme.

An aspect of the invention provides a technique for combining strict priority with weighted fair queuing. As mentioned, several priority levels for transmitting packets may be designated (e.g., from zero to seven). The prioritization among the levels may be determined according to a strict priority algorithm. This means that priority values assigned to queued packets may be compared and the packets may be ordered for retransmission from highest priority to lowest.

A different algorithm may be utilized to prioritize packets within a level. For example, assume multiple packets queued for retransmission all have the same priority. To order these packets for retransmission, another scheme may be used. For example, weighted fair queuing may be utilized based on anticipated finish times. This is useful because priority is resolved using a combination of strict priority and fair queuing algorithms.

Some legacy equipment may use a strict priority scheme based on finish times for packets. Thus, the present invention of combining strict priority with weighted fair queuing may provide compatibility between equipment that implements the combined scheme or the present invention with such legacy equipment.

Figure 16:
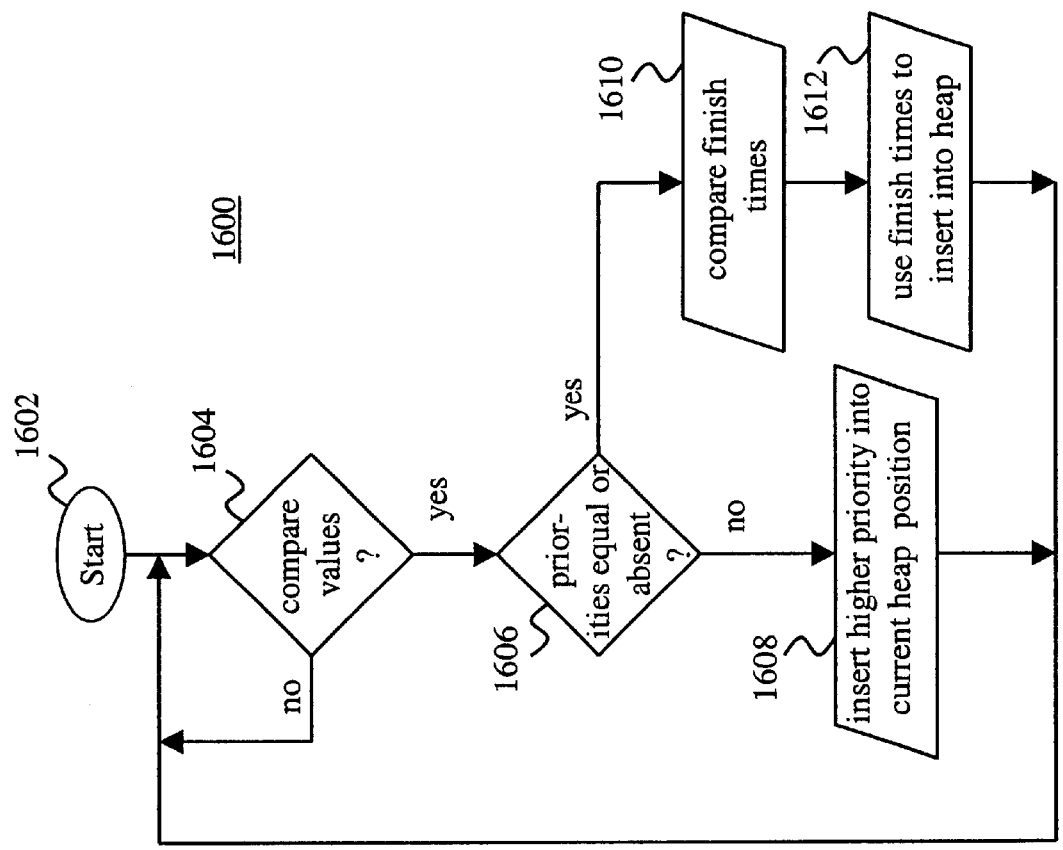
FIG. 16 illustrates a flow diagram for combining strict priority with weighted fair queuing for scheduling packets for retransmission in accordance with an aspect of the present invention.

FIG. 16 illustrates a flow diagram 1600 for combining strict priority with weighted fair queuing for scheduling packets for retransmission in accordance with the present invention. The flow diagram 1600 may control operation of the queue controller 402, heap memory 400 and scheduler 320 illustrated in FIG. 4 and may also be used to control operation of the master scheduler 322 illustrated FIGS. 3 and 15.

Program flow begins in a start state 1602. From the state 1602, program flow may move to a state 1604. In the state 1604, a determination may be made as to whether scheduling data (e.g., data 600 of FIG. 6) is to be compared. For example, such a comparison may be part of the insert instruction (e.g., state 816 of FIG. 8) or a re-insert instruction (e.g., state 914 of FIG. 9). Program flow may remain in the state 1604 until such a comparison occurs.

If there is such a comparison, program flow may move from the state 1604 to a state 1606. In the state 1606, a determination may be made as whether, as a result of such a comparison, the priorities (e.g., priority values 604 of FIG. 6) are found to be equal. Assuming the values are not equal, then program flow moves to state 1608 in which the higher priority value may be selected for earlier retransmission. For example, the higher priority value may be inserted into the heap 700, as explained above in reference to FIGS. 8 and 9. From the state 1608, program flow may return to the state 1604 to await another comparison.

If the values are found to be equal in the state 1606, then program flow may move to a state 1610. Also, if priorities are not available, such as where the packets were not assigned priorities, program flow may also move from the state 1606 to the state 1610. This may occur, for example, where the packets were received from certain types of legacy equipment. In the state 1610, finish times for the packets may be compared. From the state 1610, program flow may move to a state 1612 in which a priority scheme, such as a conventional weighted fair queuing algorithm, may be applied to the finish times for ordering the packets. Alternately, the packets may be simply ordered from earlier to later finish times, without the use of a weighted fair queuing algorithm. From the state 1612, program flow may return to the state 1604.

Thus, a two-level packet scheduling technique has been described in which strict priority based on assigned priority levels may be used for ordering packets for retransmission. A different algorithm, such as weighted fair queuing based on finish times may be used for sub-ordering packets for retransmission within priority levels. Accordingly, the priority levels may be considered a "primary key," whereas the finish times may be considered a "secondary key."

As mentioned, the anticipated finish or arrival times for data packets may be relevant for ordering retransmission of the packets. The finish time may be an anticipated time of completion for receiving a packet into the buffers 318 (FIG. 3) of a switch 300 (FIG. 3). The finish time may be computed based upon start of reception time for the packet, its length and its transmission speed (or "weight" which is inversely related to transmission speed). FIGS. 17A–17D illustrate timing diagrams for computing and comparing arrival times for packets.

Figures 17A, 17B:
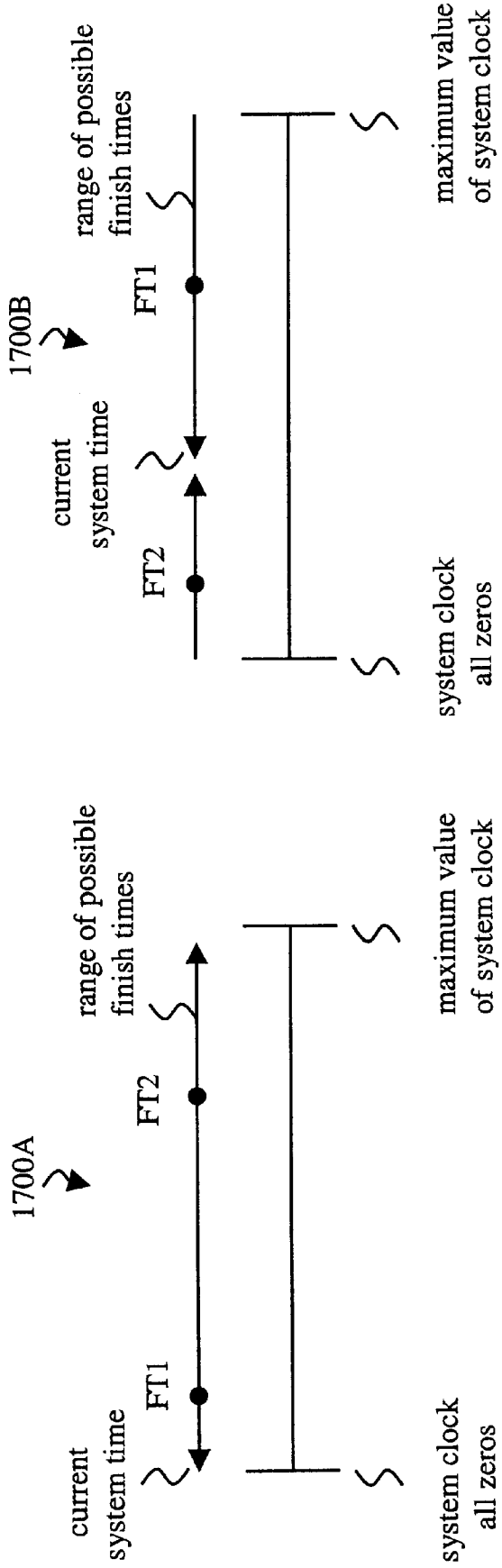
FIGS. 17A–17D illustrate timing diagrams for computing and comparing arrival times for packets in accordance with an aspect of the present invention.

The packet arrival times may be expressed relative to a time base, such as a system clock. To compute the arrival time for a particular packet, the length of the packet may be multiplied by its weight and the result may be added to the current system clock time at the start of reception of the packet. FIG. 17A shows a range 1700A of possible finish times for packets relative to system clock time base. The range 1700A represents all of the possible finish times for packets that have already started to arrive as of the current system time. Since packets are limited in length, the range of finish times is bounded, as shown by the double-headed arrow in FIG. 17A. Finish times for packets for which reception has not yet begun are not included in the range 1700A.

The system time base or clock may be expressed as a value that is incremented at uniform time intervals. Because the system clock is expressed by a finite number of bits, the clock rolls over to all zeros after it reaches its maximum value. As shown in FIG. 17A, the current system time coincides closely with the system clock being all zeros. Two exemplary computed finish times FT1 and FT2 are shown in FIG. 17A as occurring within the range 1700A. To determine which occurs first in time, their magnitudes may simply be compared. The smaller of the two may, for example, be scheduled for an earlier retransmission.

FIG. 17B illustrates a different point in time from that of FIG. 17A. In FIG. 17B, the current system time is approximately one-third of the maximum value it can reach before recycling to all zeros. FIG. 17B also shows a range 1700B of possible finish times. An exemplary finish time FT1 is expected to occur before the system clock recycles. However, some of the finish times are anticipated to occur after the system clock recycles. For example, exemplary finish time FT2 to expected to occur after the system clock recycles. It can be seen, therefore, that FT1 occurs before FT2. However, a comparison of the magnitude of finish time FT1 to that of finish time FT2 would show that FT2 is smaller. This is true because FT2 occurs after the system clock has recycled past all zeros and, thus, corresponds to a lower value of the system clock. Accordingly, the magnitude comparison performed on the finish times FT1 and FT2 of FIG. 17A would not produce the correct result if performed on the finish times FT1 and FT2 of FIG. 17B.

In accordance with an aspect of the present invention, the computed arrival times may be represented using at least one bit more than is used to express the maximum range of finish times. In other words, the length of packets may be limited to ensure that the maximum difference between packet arrival times to be compared is less than one half the maximum value that can be represented by the system clock time. In a preferred embodiment, the time base and finish times are expressed using thirty-one bits. Accordingly, the maximum value is $2^{31}-1$ in decimal. When the system clock reaches this value, it starts over from zero.

Figure 17C:
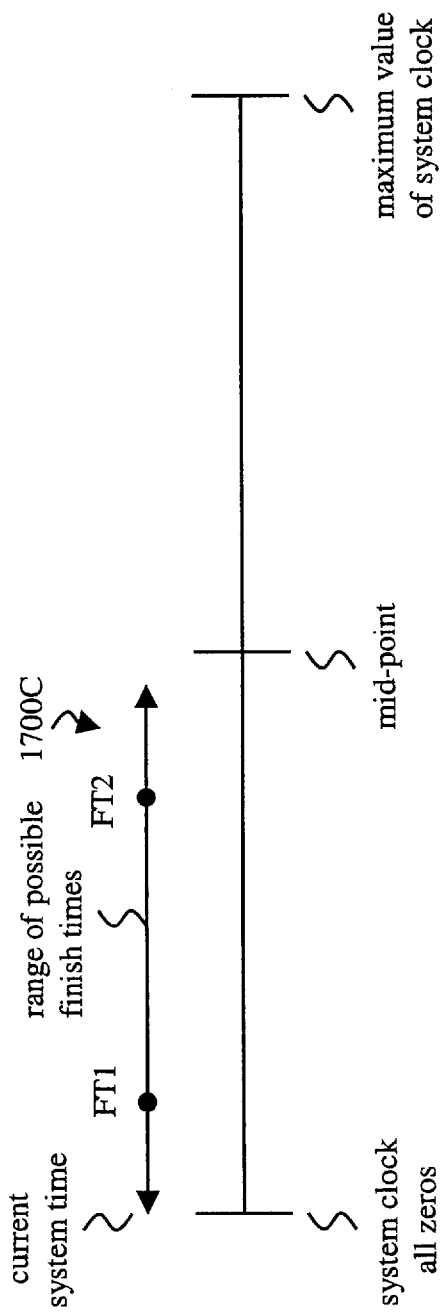

More particularly, FIG. 17C illustrates a range 1700C of possible finish times for packets relative to system clock time base. Similarly to FIG. 17A, the current system time coincides closely with the system clock being all zeros.

However, unlike FIG. 17A, the range 1700C of possible finish times is less than one-half the maximum value that the system clock can reach before recycling to all zeros. Rather, the mid-point between the minimum and maximum value of the system clock in FIG. 17C coincides with the maximum value of the system clock in FIGS. 17A–B. Two exemplary computed finish times FT1 and FT2 are shown in FIG. 17B as occurring within the range 1700C. Thus, similarly, to FIG. 17A, to determine which of the two finish times FT1 or FT2 occurs first in time, their magnitudes may simply be compared.

Figure 17D:
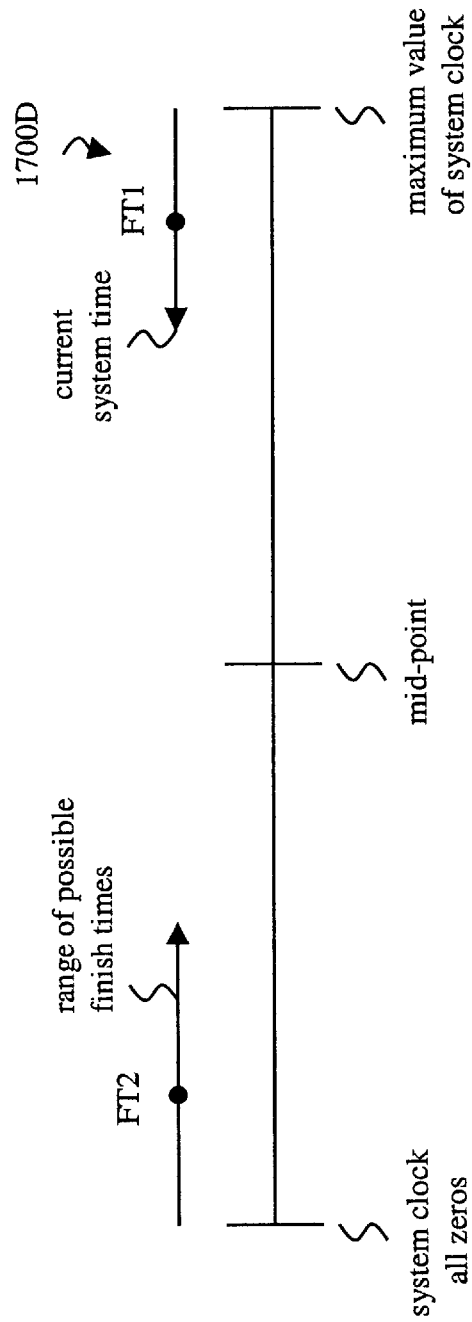

FIG. 17D illustrates a different point in time from that of FIG. 17A. In FIG. 17D, the current system time is well past the mid-point of the maximum value it can reach before recycling to all zeros. FIG. 17D also shows a range 1700D of possible finish times. Similarly to FIG. 17B, an exemplary finish time FT1 is expected to occur before the system clock recycles. Another exemplary finish time FT2 to expected to occur after the system clock recycles. It can be seen, therefore, that FT1 occurs before FT2. However, a comparison of the magnitude of finish time FT1 to that of finish time FT2 would show that FT2 is smaller. This is true because FT2 corresponds to a lower value of the system clock. Accordingly, a magnitude comparison, by itself, would not produce the correct result if performed on the finish times FT1 and FT2 of FIG. 17D. However, by determining whether the difference between the finish times FT1 and FT2 exceeds the maximum range of finish times, it can be determined that the result of a comparison of magnitudes yields a wrong result. By knowing that the result is wrong, it can then be reversed to correctly indicate which finish time occurs first.

Figure 18:
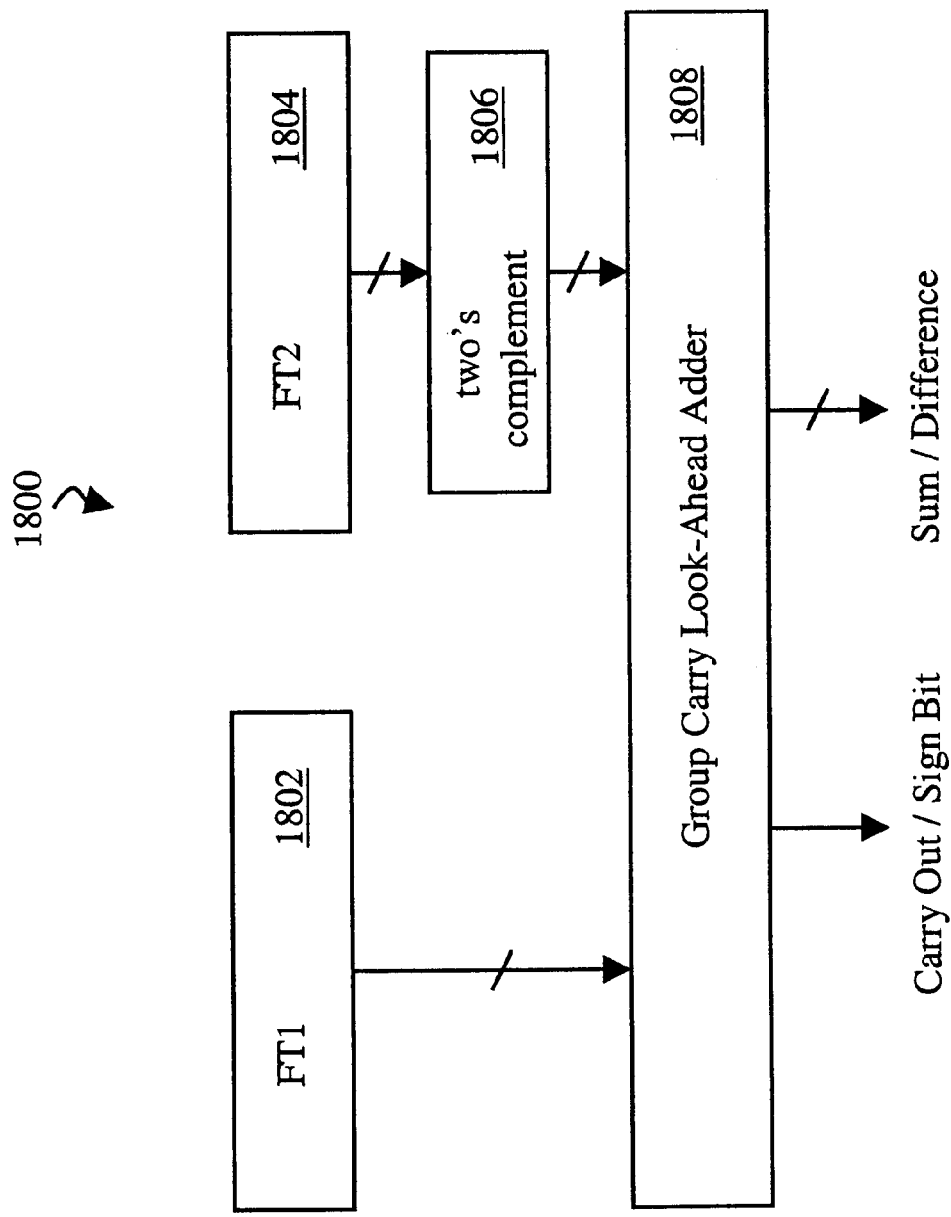
FIG. 18 illustrates a block schematic diagram of an apparatus for comparing arrival times in accordance with an aspect of the present invention.

FIG. 18 illustrates a block schematic diagram of a comparator apparatus 1800 for comparing finish times in accordance with the present invention. The comparator apparatus 1800 may be a part of the queue controller 402 (FIG. 4) and may include a first register or port 1802 for receiving a first finish time to be compared, designated FT1, and a second register or port 1804 for receiving a second finish time to be compared, designated FT2. A two's complement logic block 1806 may be coupled to the register 1804 for converting the finish time FT2 into its two's complement in accordance with known techniques. The register 1802 and the logic block 1806 may be coupled to an adder 1808 for performing two's complement subtraction in accordance with known techniques. The adder 1808 is preferably of a type that minimizes the time required to perform the addition function. For example, the adder 1808 may be a group carry look-ahead or fast carry look-ahead adder.

Outputs of the adder 1808, which may be provided at an output port of the adder 1808, may include a carry output and a sum. Because the adder 1808 performs two's complement subtraction, the carry output indicates the sign of the result. The sign indicates which of the two finish times, FT1 or FT2 is smaller in magnitude. Also because the adder 1808 performs two's complement subtraction, the sum output indicates the magnitude of the difference between the two finish times FT1 or FT2. In accordance with the present invention, the sum output is used to determine whether the sign bit correctly indicates which finish time FT1 or FT2 occurs earlier in time. More particularly, if the difference is smaller than the maximum spread or range of possible finish times, then sign bit correctly indicates which finish time is earlier. Conversely, if the difference is larger than the maximum spread or range of finish times, then the sign bit should be inverted to correctly indicate which finish time is earlier.

FIG. 19 illustrates a flow diagram 1900 for comparing finish times in accordance with the present invention. The flow diagram 1900 may, for example, control operation of the queue controller 402 (FIG. 4). Referring to FIG. 19, program flow begins in a start state 1902. From the state 1902, program flow may move to a state 1904. In the state 1904, a determination may be made as to whether finish times, such as FT1 and FT2, are to be compared. For example, such a comparison may be required to resolve scheduling conflicts between packets having equal priority values. Program flow may remain in the state 1904 until such a comparison is needed.

If such a comparison is to be performed, program flow may move from the state 1904 to a state 1906. In the state 1906, a comparison is made between the finish times FT1 and FT2 to determine which has a larger value. The comparator 1800 of FIG. 18 may be used for this comparison, in which case, the result may be given by the carry output of the adder 1808 (FIG. 18). Assuming the FT1 is smaller than FT2, program flow may move to a state 1908.

In the state 1908, a determination may be made as to whether the difference between the magnitudes of the finish times FT1 and FT2 is greater than the range of possible finish times. This may be accomplished, for example, by comparing the difference output of the adder 1808 to a predetermined threshold. Depending on the level of the threshold, only the most significant bit or bits of the difference output of the adder 1808 may be required to determine whether the threshold is exceeded.

If the magnitude of the difference is less than the range of possible finish times, then this indicates that finish time FT1 occurs first in time, as in FIG. 17C. Accordingly, no adjustment to the carry bit is needed. In which case, program flow moves from the state 1908 to a state 1910. In the state 1910 the result of the comparison performed in the state 1906 may be used to determine the correct result. From the state 1910 program flow may return to the state 1904.

If the magnitude of the difference is greater than the range of possible finish times, this indicates that finish time FT2 occurs first in time. Accordingly, the carry bit should be invert to correctly indicate which finish time is earlier. In which case, program flow moves from the state 1908 to a state 1912. In the state 1912 the result of the comparison performed in the state 1906 may be reversed to determine the correct result. From the state 1914 program flow may return to the state 1904.

Returning the state 1906, if the FT1 is greater than FT2 then program flow moves to a state 1912. If the magnitude of the difference between FT1 and FT2 is less than the range of possible finish times, this indicates that FT2 is earlier in time. In which case, program flow moves to the state 1910 since no adjustment to the result of the comparison performed in the state 1906 is required. If the magnitude of the difference between FT1 and FT2 is greater than the range of possible finish times, this indicates that FT1 is earlier in time, as in FIG. 17D. In which case, program flow moves to the state 1914 since an adjustment of the result obtained in the state 1906 should be performed.

Accordingly, a technique for comparing anticipated finish times to correctly determine which occurs earlier in time has been described.

The foregoing detailed description of the present invention is provided for the purposes of illustration and is not intended to be exhaustive or to limit the invention to the precise embodiment or embodiments disclosed. The scope of the present invention is defined by the appended claims.

What is claimed is:

1. A method of scheduling data packet transmission in a data communication network, comprising:

forming a scheduling heap data structure having a plurality of levels for storing scheduling values for data packets according to their relative priorities in which a highest level has a single position and each succeeding lower level has twice the number of positions as the preceding level; and forming a plurality of logical heaps within the heap data structure by assigning a highest level of each logical heap to a level in the heap data structure that is lower than the highest level of the heap data structure.

2. The method according to claim 1, further comprising assigning each logical heap to one of a plurality of communication channels.

3. The method according to claim 2, further comprising inserting a scheduling value for a received data packet into one of the logical heaps according the communication channel by which the data packet is received.

4. The method according to claim 1, further comprising performing an insert operation at a level in the heap data structure by comparing a scheduling value assigned to a first data packet to a scheduling value assigned to a second data packet at the level, placing a higher priority one of the compared values in the level, and retaining the lower priority of the compared values to be placed elsewhere in the heap.

5. The method according to claim 4, further comprising performing a reinsert operation in the heap data structure comprising inserting a scheduling value in a position emptied by retransmission of a corresponding data packet and percolating the heap.

6. The method according to claim 5, wherein when a new scheduling value is available, said reinsert operation comprises inserting the new scheduling value into the emptied position.

7. The method according to claim 5, wherein when a new scheduling value is not available, said reinsert operation comprises moving a scheduling value at a position at the bottom of heap to the emptied position.

8. The method according to claim 5, further comprising performing said reinsert and insert operations in accordance with a pipelined sequence at each level in the heap.

9. The method according to claim 8, comprising allocating operations in the pipelined sequence to each of the plurality of logical heaps based on a communication bandwidth assigned to the corresponding logical heap.

10. The method according to claim 9, wherein said operations are allocated in proportion to the bandwidth assigned to the corresponding logical heap.

11. The method according to claim 9, said pipelined sequence comprising at least one cycle for the reinsert operation, at least one cycle for the insert operation and at least one no-operation cycle.

12. The method according to claim 11, wherein when conditions for performing an insert or a reinsert operation are not satisfied, the operation is skipped during its corresponding cycle.

13. A system for scheduling data packet transmission comprising a scheduling heap data structure having a plurality of levels for storing scheduling values for data packets according to their relative priorities in which a highest level has a single position and each succeeding lower level has twice the number of positions as the preceding level, the heap data structure including a plurality of logical heaps within the heap data structure, wherein a highest level of each logical heap is assigned to a level in the heap data structure that is lower than the highest level of the heap data structure; and a queue controller coupled to the data structure for manipulating scheduling values in the heap data structure.

14. The system according to claim 13, wherein each logical heap is assigned to one of a plurality of communication channels.

15. The system according to claim 14, wherein the queue controller inserts a scheduling value for a received data packet into one of the logical heaps according the communication channel by which the data packet is received.

16. The system according to claim 13, the queue controller performs an insert operation at a level in the heap data structure by comparing a scheduling value assigned to a first data packet to a scheduling value assigned to a second data packet at the level, placing a higher priority one of the compared values in the level, and retaining the lower priority of the compared values to be placed elsewhere in the heap.

17. The system according to claim 16, wherein the queue controller performs a reinsert operation in the heap data structure by inserting a scheduling value in a position emptied by retransmission of a corresponding data packet and percolating the heap.

18. The system according to claim 17, wherein when a new scheduling value is available, said reinsert operation includes the queue controller inserting the new scheduling value into the emptied position.

19. The system according to claim 17, wherein when a new scheduling value is not available, said reinsert operation includes the queue controller moving a scheduling value at a position at the bottom of heap to the emptied position.

20. The system according to claim 17, wherein the queue controller performs said reinsert and insert operations in accordance with a pipelined sequence at each level in the heap.

21. The system according to claim 20, wherein the queue controller allocates operations in the pipelined sequence to each of the plurality of logical heaps based on a communication bandwidth assigned to the corresponding logical heap.

22. The method according to claim 21, wherein said operations are allocated in proportion to the bandwidth assigned to the corresponding logical heap.

23. The system according to claim 21, said pipelined sequence comprising at least one cycle for the reinsert operation, at least one cycle for the insert operation and at least one no-operation cycle.

24. The system according to claim 23, wherein when conditions for performing an insert or a reinsert operation are not satisfied, the operation is skipped during its corresponding cycle.

* * * * *